United States Patent [19]
Yoshie et al.

[11] Patent Number: 5,718,776
[45] Date of Patent: Feb. 17, 1998

[54] STEEL PLATE LESS SUSCEPTIBLE TO WELDING DISTORTION AND HIGHLY BENDABLE BY LINEAL HEATING, PROCESS FOR PRODUCING SAID STEEL PLATE, WELDING MATERIAL, AND WELDING METHOD USING SAID WELDING MATERIAL

[75] Inventors: Atsuhiko Yoshie; Takashi Fujita, both of Futtsu; Yokimi Kawashima; Masaaki Nagahara, both of Oita; Kazuhiro Kojima, Futtsu; Tadashi Kasuya, Futtsu; Yukihiko Horii, Futtsu; Tsukasa Yoshimura, Futtsu, all of Japan

[73] Assignee: Nippon Steel Corporation, Tokyo, Japan

[21] Appl. No.: 604,971

[22] PCT Filed: Sep. 20, 1994

[86] PCT No.: PCT/JP94/01549

§ 371 Date: Mar. 20, 1996

§ 102(e) Date: Mar. 20, 1996

[87] PCT Pub. No.: WO95/08655

PCT Pub. Date: Mar. 30, 1995

[30] Foreign Application Priority Data

| Sep. 20, 1993 | [JP] | Japan | 5-233646 |
| Sep. 20, 1993 | [JP] | Japan | 5-233647 |
| Oct. 12, 1993 | [JP] | Japan | 5-277322 |
| Mar. 9, 1994 | [JP] | Japan | 6-038820 |
| Mar. 9, 1994 | [JP] | Japan | 6-038821 |

[51] Int. Cl.$^6$ ............... C22C 38/12; C21D 8/02; B23K 9/00

[52] U.S. Cl. ............... 148/320; 148/654; 148/648; 420/123; 420/127; 219/137 WM; 219/146.1; 219/146.23; 219/121.33

[58] Field of Search ............... 148/320, 654, 148/648, 661; 420/123, 127; 219/137, 137 WM, 146.1, 146.23, 121.33; 72/700

[56] References Cited

U.S. PATENT DOCUMENTS 4,203,024  5/1980  Pokhodnya et al. ............... 219/146.1

(List continued on next page.)

FOREIGN PATENT DOCUMENTS 573553  6/1988  Australia .

(List continued on next page.)

OTHER PUBLICATIONS

Patent Abstracts of Japan, vol. 18, No. 377 (C-1225), Jul. 15, 1994, for JP-A-06 100933.

(List continued on next page.)

*Primary Examiner*—Deborah Yee
*Attorney, Agent, or Firm*—Kenyon & Kenyon

[57] ABSTRACT

In the present invention, a steel product having a specified composition comprising by weight C: 0.02 to 0.25%, Si: 0.01 to 2.0%, Mn: 0.30 to 1.5%, Al: 0.003 to 0.10%, Nb: 0.005 to 0.10%, and Mo: 0.05 to 1.00% with the balance consisting of Fe and unavoidable impurities is used to prepare a steel plate having a thickness of 3 to 100 mm (the upper limits of the Nb and Mo contents each being 0.025% particularly for a plate thickness of 3 to 25 mm), and the ratio of the yield stress of the steel plate at a temperature T, $\sigma_{yT}$, to the yield stress of the steel plate at room temperature, $\sigma_y$, over the temperature range of room temperature to 600° C. is brought to a value falling within the following range:

$$1.00 - 1.083 \times 10^{-3} T < (\sigma_{yT}/\sigma_y) < 1.16 - 5.101 \times 10^{-4} T.$$

Further, the constituents of a welding material are specified to bring the $\gamma_3$ transformation temperature to below 620° C., and, regarding the yield stress of a deposited metal, the ratio of the yield stress of a deposited metal at a temperature $T_0$, $\sigma_{yoT0}$, to the yield stress of the deposited metal at room temperature, $\sigma_{yo}$, satisfies a requirement represented by the formula (4) over the temperature range of room temperature to 600° C.:

$$1.00 - 1.083 \times 10^{-3} T_0 < (\sigma_{yoT0}/\sigma_{yo}) < 1.16 - 5.101 \times 10^{-4} T_0.$$

The above steel plate is welded using the above welding material to provide a welded steel plate less susceptible to welding distortion.

23 Claims, 8 Drawing Sheets

U.S. PATENT DOCUMENTS

| | | |
|---|---|---|
| 4,299,621 | 11/1981 | Giflo . |
| 5,147,474 | 9/1992 | Tamehiro et al. ............... 148/320 |

FOREIGN PATENT DOCUMENTS

| | | | |
|---|---|---|---|
| 51-126320 | 11/1976 | Japan . | |
| 53-29219 | 3/1978 | Japan . | |
| 53-7372 | 3/1978 | Japan . | |
| 61-67717 | 4/1986 | Japan ............................. | 148/654 |
| 61-286089 | 12/1986 | Japan . | |
| 62-33093 | 2/1987 | Japan . | |
| 62-33094 | 2/1987 | Japan . | |
| 62-142726 | 6/1987 | Japan . | |
| 1-176029 | 7/1989 | Japan . | |
| 1-176030 | 7/1989 | Japan . | |
| 3-180442 | 8/1991 | Japan . | |
| 6-100933 | 4/1994 | Japan . | |

OTHER PUBLICATIONS

Patent Abstracts of Japan, vol. 13, No. 457 (C–644), Oct. 16, 1989 for JP-A-01 176029.

Patent Abstracts of Japan, vol. 13, No. 457 (C–644), Oct. 16, 1989 for JP-A-01 176030.

Patent Abstracts of Japan, vol. 15, No. 429 (C–880), Oct. 31, 1991 for JP-A-03 180442.

$\delta = \frac{1}{2}\sin^{-1}(2d/W)$

STEEL PLATE LESS SUSCEPTIBLE TO WELDING DISTORTION AND HIGHLY BENDABLE BY LINEAL HEATING, PROCESS FOR PRODUCING SAID STEEL PLATE, WELDING MATERIAL, AND WELDING METHOD USING SAID WELDING MATERIAL

TECHNICAL FIELD

The present invention relates to a steel plate, which is less susceptible to welding distortion and highly deformable by lineal heating, for use in shipbuilding, offshore structures, buildings, bridges, civil engineering and the like, a process for producing the steel plate, a welding material for use in welding of the steel plate, and a method for welding the steel plate.

BACKGROUND ART

In various steel structures, at the time of welding of steel products, shrinkage on solidification of a molten metal and shrinkage and expansion on subsequent cooling and phase transformation result in an out-of-plane distortion called "angular distortion," for example, in the case of joints model by fillet welding. Such residual deformation causes a lowering in structural strength, that is, a lowering in buckling resistance, for example, when a compressive load is applied. An attempt to forcibly prevent such distortion by means of a welding jig results in the creation of excessive residual stress. Further, this results in unsatisfactory dimensional accuracy and, hence, poses a problem, associated with the production of structures, resulting in deteriorated appearance. For this reason, various proposals on straightening by local heating of residual deformation created at the time of welding, such as described in "Yosetu Henkei No Hassei To Sono Boshi (Occurrence of Distortion in Welding and Its Prevention)" in Journal of Japan Welding Society (J.W.S.), Vol. 52, Nos. 4–9, 1983, have been made based on experience. Reheating a weld, however, unavoidably leads to deteriorated quality. In addition, the time and cost necessary for the straightening work pose a serious problem. Therefore, the development of a welding method which can reduce or eliminate the straightening work, has been desired in the art.

Meanwhile, steel products used in upper structures of shipbuilding should be as thin as possible from the viewpoint of a reduction in weight. Regarding other structures as well, the use of a thin steel sheet has been desired with a view to reducing the weight. Reducing the plate thickness, however, causes the welding distortion to become significant, necessitating a great deal of labor in a work, prior to welding, for preventing creating a strain or repair of distortion created in welding (straightening).

A measure taken up to now has been mainly based on an improvement in a welding process and straightening as described in "Yosetu Henkei No Hassei To Sono Boshi (Occurrence of Distortion in Welding and Its Prevention)" in Journal of Japan Welding Society (J.W.S.), Vol. 52, Nos. 4–9, 1988. Such techniques, however, need additional work and apparatuses and, hence, unavoidably cause an increase in cost. Therefore, the development of a steel product in which welding distortion can be universally reduced has been desired in the art. Up to now, however, no useful technique for reducing welding distortion through an improvement in a steel product has been reported in the art.

Mechanisms for the creation of residual stress and distortion in a weld are described in detail in Sato, "Yosetu Kozo Binran," 1988, Kuroki Shuppan and K. Masubuchi, "Analysis of Welded Structures" 1980 PERGAMON PRESS. These publications describe that the distortion in welding is determined mainly by the geometry of the member with respect to welding heat input. That is, they do not focus on detailed properties of the welding material used. That the phase transformation temperature of a weld in a steel structure is a factor which affects the residual stress and distortion is described in the above publications. However, no study is specifically made on the quantification of influence and components with respect to a welding material contemplated for steel structures.

Sato shows in Journal of Japan Welding Society (J.W.S.), Vol. 45, No. 7, 1976 that, even in the case of an identical $Q/h^2$, wherein h represents plate thickness and Q represents welding heat input, the welding distortion can be reduced when steel products are different from each other. This is finding for a steel having a tensile strength on the order of 800 MPa or a 9% Ni steel but is not finding which can be applicable to general-purpose low-alloy steels.

Further, there are also reports wherein relaxation of residual stress and a reduction in distortion have been studied with attention focused on a superplastic phenomenon of phase transformation (Preprints Of The National Meeting Of J.W.S., the 39th series, p. 338–339 and p. 340–341). In these studies, attention is focused on martensite transformation of low-alloy steels and stainless steels. The finding in these studies, as such, is not applicable to the constituents and structure of common steel products. Further, such a high Ni content incurs a higher welding material cost and is not suitable for practical use although the step of straightening can be omitted. Furthermore, the application of the above finding to common steels and low-alloy steels for shipbuilding and offshore structures causes the weld metal to become electrically excessively noble and, hence, leads to selective corrosion in weld heat-affected zone, posing a problem.

The factor which most affects the distortion in welding is heat input as a function of the thickness of the steel product, and the factor which next most affects the distortion in welding is the phase transformation temperature of the weld metal. In addition, the strength of the steel product can be increased at a temperature, at which the distortion is created, so as to resist the distortion. The phase transformation temperature is approximately in the range of from 400° to 700° C. That the distortion can be reduced by increasing the strength in this temperature region through the addition of elements such as Cr, Mo, V, and Nb can be expected, for example, from the high-temperature strength of a Cr—Mo steel. However, no study has been made on the assurance of the high-temperature strength at the transformation temperature in a weld metal. Further, since these additive elements are likely to increase the transformation temperature and consequently increase the welding distortion, the optimum amount of these elements added cannot be easily determined.

The present inventors have already proposed gas shielded arc welding methods in Japanese Unexamined Patent Publication (Kokai) Nos. 4-22596 and 4-22597. In these proposals, a steel wire is used as the welding material, and the steel product used is conventional and does not have an increased yield strength at 400° to 700° C. In general, when welding is carried out with a steel wire, the depth of penetration of the steel wire at the time of welding is so large that the reduction in welding distortion is not always satisfactory.

Methods for fabricating a steel plate into a product having a complicated curved surface, such as an outer plate of a hull, include cold rolling, exemplified by working with a bending roller and pressing, and thermoplastic working utilizing lineal heating with a gas burner. Among them, the most commonly used technique is the lineal heating method. Various studies have hitherto been made on lineal heating, as described in, for example, Suhara et al., "Kozai No Netusosei Kako Ni Kansuru Kenkyuu 1, 2," Journal Of The Society Of Naval Architects Of Japan, Nos. 103 and 106, Sato et al., "Senjo Kanetu Ban MageKako Ni Okeru Suirei No Koka," Journal Of The Society Of Naval Architects Of Japan, No. 126, and Araki et al., "Senjo Kanetu Kakoho Ni Yoru Kohan No Kaku Henkeiryo Ni Tuite," Journal Of The Society of Naval Architects Of Japan, No. 133. These studies, however, are on heating and cooling means for lineal heating. There is no report on materials suitable for lineal heating, and the development of a steel plate, which exhibits high angular distortion upon lineal heating, has been desired in the art.

An object of the present invention is to eliminate the above problems of the prior art and to provide a steel plate less susceptible to welding distortion and highly bendable by lineal heating and a process for producing the same.

Another object of the present invention is to provide a welding material and a welding method which can reduce welding distortion.

CONSTRUCTION OF INVENTION

In order to solve the above problems, the present invention is characterized in that precipitate forming elements added, in combination, to a steel plate are precipitated during welding heat history to bring the steel plate to a predetermined yield stress range according to temperature change during welding, thereby suppressing the angular distortion for an identical welding heat input, and the change in yield stress of the deposited metal during welding is specified to further reduce the angular distortion in welding.

Further, the present invention is characterized in that the welding distortion is reduced by taking advantage of interaction among (1) the limitation of constituents of the steel plate to increase the yield strength at 700° to 400° C., (2) the limitation of constituents of a wire, such as a solid wire, a flux cored wire, or a metal cored wire to increase the yield strength of the deposited metal at 700° to 400° C., or alternatively, a decrease in $Ar_3$ transformation temperature of the welding material to increase the expansion upon distortion, and (3) welding under conditions satisfying a requirement of a $Q/h^2$ of not more than 3 Kcal/cm$^3$.

The subject matter of the present invention is as follows. A steel product having a specified composition comprising by weight C: 0.02 to 0.25%, Si: 0.01 to 2.0%, Mn: 0.30 to 1.5%, Al: 0.003 to 0.10%, Nb: 0.005 to 0.10%, and Mo: 0.05 to 1.00% with the balance consisting of Fe and unavoidable impurities is used to prepare a steel plate having a thickness of 3 to 100 mm (the upper limits of the Nb and Mo contents each being 0.025% particularly for a plate thickness of 3 to 25 mm), and the ratio of the yield stress of the steel plate at a temperature T, $\sigma_{yT}$, to the yield stress of the steel plate at room temperature, $\sigma_y$, over the temperature range of room temperature to 600° C. is brought to a value satisfying a requirement represented by the formula (1):

$$1.00-1.083\times10^{-3}T<(\sigma_{yT}/\sigma_y)<1.16-5.101\times10^{-4}T \quad (1)$$

wherein T: temperature of the steel plate in the range of room temperature to 600° C., °C.;

$\sigma_{yT}$: yield stress of the steel plate at a temperature T, MPa; and $\sigma_y$: yield stress of the steel plate at room temperature, MPa.

When the plate thickness is in the range of from 3 to 25 mm, the yield stress particularly preferably falls within a range represented by the following formula (2):

$$1.00-1.083\times10^{-3}T<(\sigma_{yT}/\sigma_y)<1.16-7.333\times10^{-4}T \quad (2)$$

Next, a welding material is specified to comprise, by weight based on the total weight of a weld metal, C: 0.03 to 0.15%, Si: 0.2 to 1.0%, and Mn: 0.3 to 3.0% and at least one member selected from Cu: 0.1 to 1.5%, Cr: 0.1 to 3.0%, Mo: 0.1 to 2.0%, V: 0.1 to 0.7%, and Nb: 0.01 to 0.50% with the balance consisting of Fe and unavoidable impurities, and the α-γ transformation temperature T, determined by the formula (3) with respect to % by weight of each element in the weld metal, is brought to below 620° C.:

$$T\ (°C.)=630-476.5C+56Si-19.7Mn-16.3Cu-26.6Ni-4.9Cr+ 38.1Mo+124.8V+136.3Ti19.1Nb+198.4Al+3315B \quad (3)$$

When the above welding material is used for welding, the yield stress of the deposited metal can be regulated so as to fall within a range defined by the following formula (4), preferably a range defined by the following formula (5), according to the temperature distribution in the thickness direction of the plate:

$$1.00-1.083\times10^{-3}T_0<(\sigma_{yoT0}/\sigma_{yo})<1.16-5.101\times10^{-4}T_0 \quad (4)$$

$$1.00-1.083\times10^{-3}T_0<(\sigma_{yoT0}/\sigma_{yo})<1.16-7.333\times10^{-4}T_0 \quad (5)$$

wherein $T_0$: temperature of the deposited metal in the range of room temperature to 600° C., °C.;

$\sigma_{yoT0}$: yield stress of the deposited metal at a temperature $T_0$, MPa; and $\sigma_{yo}$: yield stress of the deposited metal at room temperature, MPa.

In the present invention, even when the above steel plate is used separately from the above welding material, the angular distortion in welding is much smaller than that in the conventional welding. The use of the above steel plate in combination with the above welding material results in further reduced angular distortion in welding.

According to any aspect of the present invention, the angular distortion in welding is so small that the welding heat input can be increased (i.e., $Q/h^2$ can be close to 3 kcal/cm$^3$), making it easy to carry out welding.

BEST MODE FOR CARRYING OUT THE INVENTION

Figure 1:
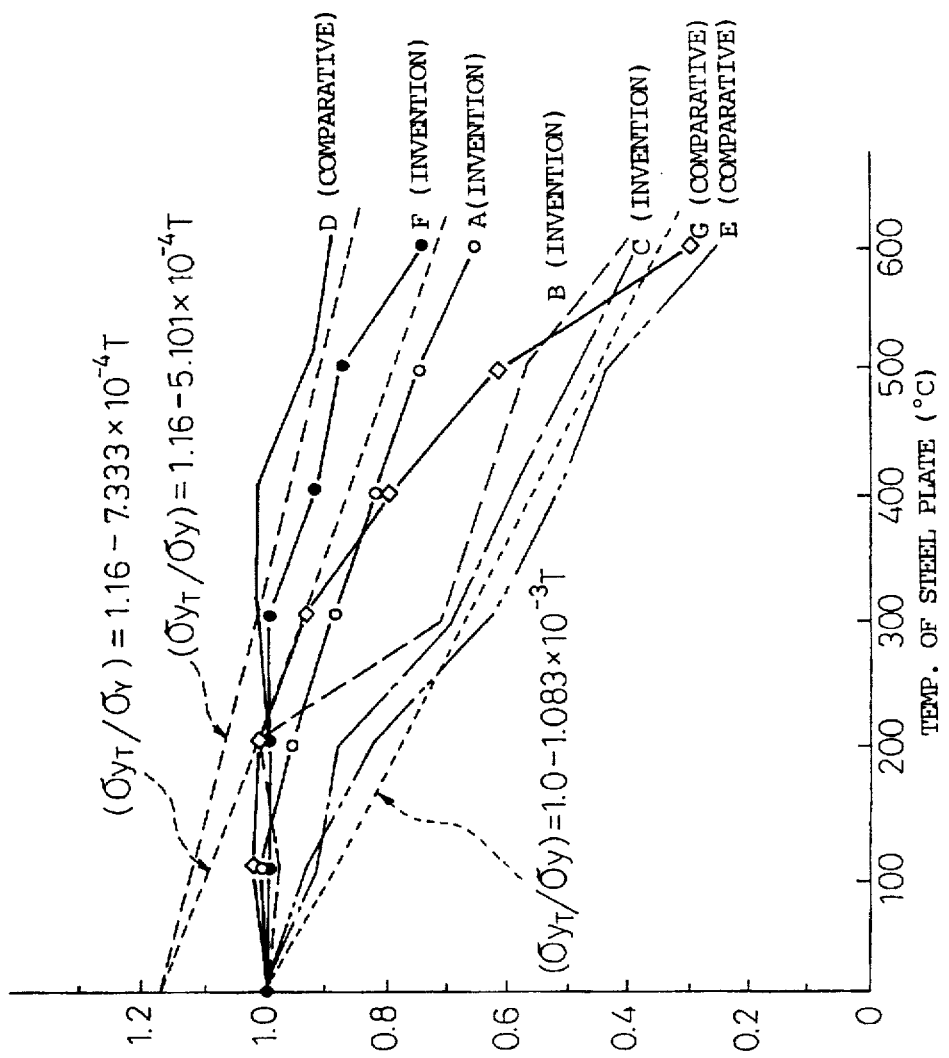
FIG. 1 is a diagram showing the relationship between the temperature of a steel plate and the ratio of the yield stress of the steel plate at the indicated temperature to the yield stress of the steel plate at room temperature.

At the outset, the technical idea of the present invention will be described.

In order to prevent welding distortion of a steel plate, it is necessary to prevent angular distortion associated with welding heating history and buckling deformation after the creation of residual stress in welding. For this purpose, various welding methods and welding devices, for example, those wherein the welding heat input is made smaller with respect to the thickness of a steel plate to be welded, or alternatively tensile stress is applied prior to welding. None of the attempts to reduce the strain in welding by improving steel products have succeeded.

In general, a temperature distribution occurs in the plate thickness direction during welding, and a portion near a weld bead is exposed to a high temperature. Consequently, the thermal stress immediately exceeds the yield stress of the steel plate, causing plastic deformation to proceed. The progress of the plastic deformation increases the plastic strain, and residual stress attributable to the plastic strain is created when the temperature after welding is decreased to room temperature. In general, the residual stress in this portion becomes a tensile stress, causing contraction distortion. The magnitude of the residual stress is the yield stress at room temperature. Therefore, the higher the yield stress at room temperature, the higher the residual stress and the higher the driving force for the contraction distortion.

In a position away from the weld bead, since the temperature of the steel plate is not increased very much, the thermal stress exceeds the yield stress considerably later than at the position near the weld bead. In this case, when the yield stress at a position away from the weld bead is not lowered very much by raising the temperature, the yield stress serves as resistance to distortion even though the angular distortion is caused by contraction in the position near the weld bead.

Therefore, if a lowering in the yield stress can be suppressed by precipitation strengthening through the addition of Nb in combination with Mo, depending upon the temperature rise attributable to welding heat history, the angular distortion in welding could be suppressed. The residual stress in welding, when the temperature after the completion of welding is lowered to room temperature, is the yield stress at room temperature. Therefore, when the yield stress at room temperature is excessively large, the residual stress causes thermal buckling, resulting in the creation of distortion in welding different from the angular distortion in welding. For this reason, the avoidance of excessive yield stress at room temperature and the reduction in yield stress in a high temperature region during welding heat history should be balanced for the suppression of the final distortion in welding. The upper limit of the yield stress at room temperature is determined by a balance between the yield stress at room temperature and the yield stress in a high temperature region and, hence, cannot be unconditionally specified. However, it is preferably not more than 36 kgf/mm$^2$ as a measure. The metallic structure should be ferritic, and low-temperature transformation structures, such as bainite and martensitic structures, should be limited to less than 30% in terms of percentage area.

Thus, low yield stress at room temperature and high yield stress at a high temperature during welding heat history are indispensable for suppressing the distortion in welding. The yield strength of a common steel continuously and uniformly decreases with raising the temperature. Therefore, in order to satisfy this requirement, the ratio of the yield stress at room temperature ($\sigma_y$) to the yield stress ($\sigma_{yT}$) at a high temperature during welding heat history, that is, $\sigma_{yT}/\sigma_y$, should be increased (i.e., brought close to 1). In other words, the angular distortion in welding can be suppressed by regulating the yield stress of the steel plate according to the welding heat history so as to fall within a predetermined range.

In the present invention, the thickness of the contemplated steel plate is limited to 3 to 100 mm. When the plate thickness is less than 3 mm, the whole surface in the plate thickness direction yields substantially at once, resulting in loss of the effect of the present invention and, at the same time, causing thermal buckling due to residual stress in welding. When the plate thickness exceeds 25 mm, the distortion in welding is rapidly reduced, and a thickness exceeding 100 mm poses substantially no problem of angular distortion in welding.

The steel plate of the present invention is characterized in that the yield stress is brought to a value falling within a predetermined range according to the temperature distribution of the plate sheet thickness direction created by welding. In this case, the yield stress should satisfy a requirement represented by the formula (1), preferably a requirement represented by the formula (2):

$$1.00-1.083\times10^{-3}T<(\sigma_{yT}/\sigma_y)<1.16-5.101\times10^{-4}T \quad (1)$$

$$1.00-1.083\times10^{-3}T<(\sigma_{yT}/\sigma_y)<1.16-7.333\times10^{-4}T \quad (2)$$

wherein T: temperature of the steel plate in the range of room temperature to 600° C., °C.;

$\sigma_{yT}$: yield stress of the steel plate at a temperature T, MPa; and $\sigma_y$: yield stress of the steel plate at room temperature, MPa.

In this case, when ($\sigma_{yT}/\sigma_y$) is smaller than the lower limit represented by the left side of the formula (1) and (2), the position apart from the weld bead is also easily yielded by the welding heat history, making it impossible to prevent the angular distortion. On the other hand, when ($\sigma_{yT}/\sigma_y$) is larger than the upper limit represented by the right side of the formula (1), preferably the formula (2), there is a possibility that plastic deformation does not proceed even at the position near the weld bead, causing cracking of the weld metal per se. Further, various experiments have revealed that the influence of the yield stress at a temperature above 600° C. on the angular distortion in welding is small. Therefore, in the formulae (1) and (2), specifying the yield stress in the temperature range of from room temperature to 600° C. suffices for the object of the present invention.

The welding distortion can also be suppressed by utilizing the phenomenon that the yield stress of the deposited metal varies depending upon the welding heat history. The deposited metal undergoes contraction distortion in the course of lowering in temperature in solidification following melting.

In this case, when the yield stress of the deposited metal falls within a range satisfying the formula (4), preferably the formula (5), the welding distortion can be suppressed:

$$1.00-1.083\times10^{-3}T_0 < (\sigma_{yoT0}/\sigma_{yo}) < 1.16-5.101\times10^{-4}T_0 \quad (4)$$

$$1.00-1.083\times10^{-3}T_0 < (\sigma_{yoT0}/\sigma_{yo}) < 1.16-7.333\times10^{-4}T_0 \quad (5)$$

wherein $T_0$: temperature of the deposited metal in the range of room temperature to 600° C., °C.;

$\sigma_{yoT0}$: yield stress of the deposited metal at a temperature $T_0$, MPa; and $\sigma_{yo}$: yield stress of the deposited metal at room temperature, MPa.

In this case, when $(\sigma_{yoT0}/\sigma_{yo})$ is smaller than the lower limit represented by the left side of the formulae (4) and (5), the plastic deformation during welding becomes so large that the angular deformation is increased. On the other hand, when $(\sigma_{yoT0}/\sigma_{yo})$ is larger than the upper limit represented by the right side of the formula (4), preferably the formula (5), the deposited metal per se is likely to crack during welding heat history.

Further, when the steel plate of the present invention is welded using the welding material of the present invention, the angular distortion in welding can be further reduced by virtue of a synergistic effect.

The present invention is independent of the welding method, and, as previously reported, the welding strain can be made small by decreasing the welding heat input. According to the previous report, the angular distortion becomes a maximum when welding conditions satisfies a requirement of $Q/h^2 = 3$ to 5 (kcal/cm$^3$) wherein h represents plate thickness, cm, and Q represents welding heat input per unit length, cal/cm. For this reason, the welding strain can be further suppressed when welding is carried out under a condition such that $Q/h^2$ is smaller than or larger than the range of from 3 to 5 kcal/m$^3$.

The angular distortion in the present invention, however, is small on the whole. Therefore, it is not influenced by the welding heat input, and the angular distortion in welding can be suppressed to a small value of not more than $1.55\times10^{-2}$ rad even when $Q/h^2$ is 3 to 5 kcal/cm$^3$, offering very advantageous welding conditions.

The characteristics of the present invention will now be described based on the experimental data.

Figure 2:
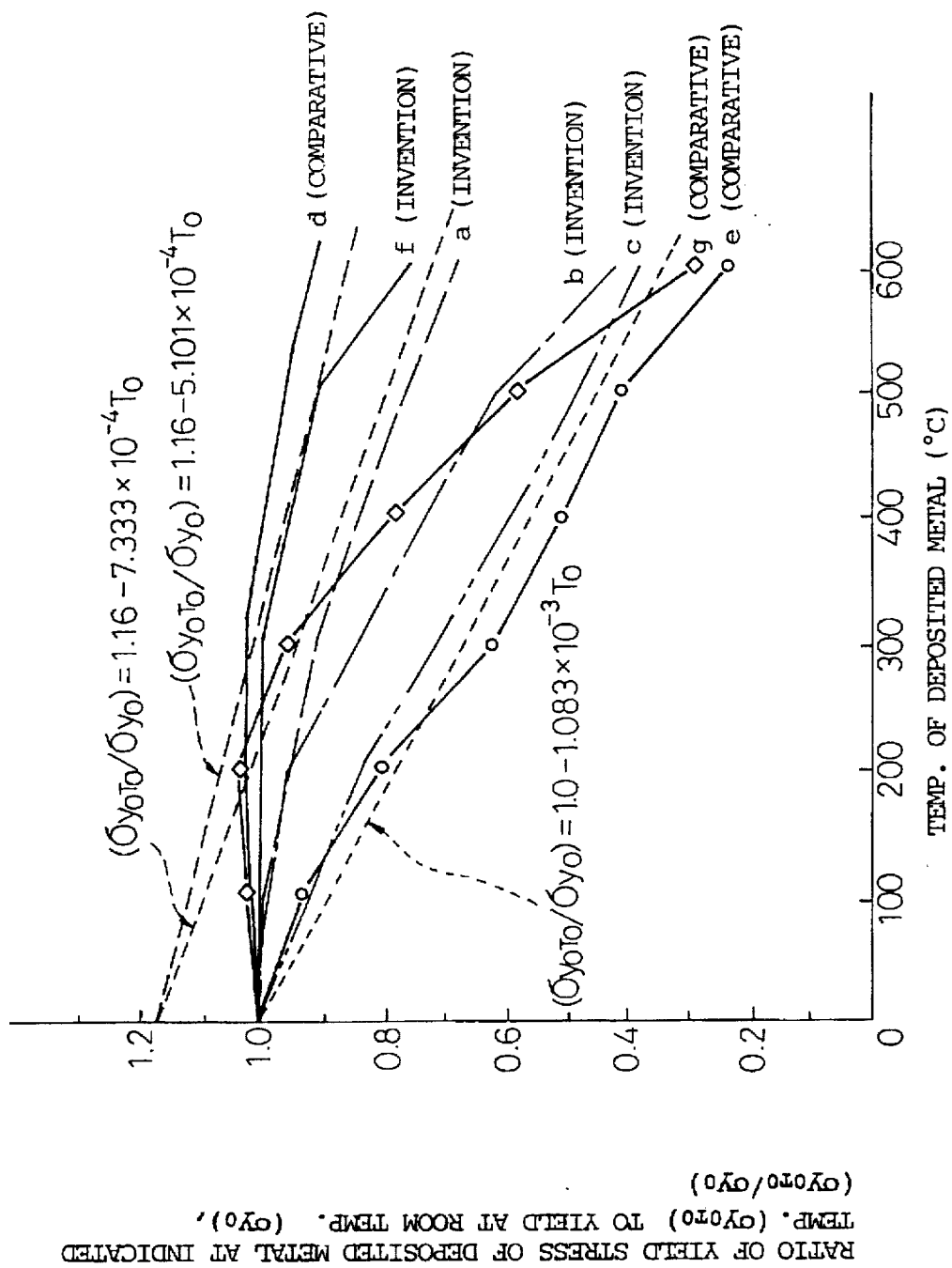
FIG. 2 is a diagram showing the relationship between the temperature of a weld metal and the ratio of the yield stress of the weld metal at the indicated temperature to the yield stress of the weld metal at room temperature.

At the outset, steel plates (A to G) having the temperature dependence of yield stress as shown in FIG. 1 were welded using welding materials (a to g) having the temperature dependence of yield stress as shown in FIG. 2 under welding conditions specified in Table 1.

FIG. 1 is a graph showing the relationship between the ratio of the yield stress of the steel plate at indicated temperature (T), $\sigma_{yT}$, to the yield stress of the steel plate at room temperature, $\sigma_y$, i.e., $\sigma_{yT}/\sigma_y$, and the temperature of a steel plate (T). For the steel plates of the present invention (A, B, C, and F), the $\sigma_{yT}/\sigma_y$ value is in the range of from $(1.16-5.1101\times10^{-4}T)$ to $(1.0-1.083\times10^{-3}T)$. The $\sigma_{yT}/\sigma_y$ value is particularly preferably in the range of from $(1.16-5.1101\times10^{-4}T)$ to $(1.16-7.333\times10^{-4}T)$.

Similarly, FIG. 2 is a graph showing the relationship between the ratio of the yield stress of the deposited metal at indicated temperature $(T_0)$, $\sigma_{yoT0}$, to the yield stress of the deposited metal at room temperature, $\sigma_{yo}$, i.e., $\sigma_{yoT0}/\sigma_{yo}$, and the temperature of the deposited metal $(T_0)$. For the welding materials of the present invention (a, b, c, and f), the $\sigma_{yoT0}/\sigma_{yo}$ value is in the range of from $(1.16-5.101\times10^{-4}T_0)$ to $(1.0-1.083\times10^{-3}T_0)$. The $\sigma_{yoT0}/\sigma_{yo}$ value is particularly preferably in the range of from $(1.16-5.101\times10^{-4}T_0)$ to $(1.16-7.333\times10^{-4}T_0)$.

TABLE 1

| Symbol for welding conditions | Welding conditions | Heat input per unit length (Kcal/cm) |
|---|---|---|
| (1) | Horizontal fillet welding of T-joint, current 240A, voltage 24 V, welding speed 80 cm/min, not preheated, shielding gas $CO_2$ | 1.03 |
| (2) | Horizontal fillet welding of T-joint, current 180A, voltage 26 V, welding speed 30 cm/min, not preheated, shielding gas $CO_2$ + Ar | 2.23 |
| (3) | Horizontal fillet welding of T-joint, current 220A, voltage 22 V, welding speed 80 cm/min, not preheated, shielding gas $CO_2$ | 0.864 |
| (4) | Horizontal fillet welding of T-joint, current 220A, voltage 22 V, welding speed 130 cm/min, not preheated, shielding gas $CO_2$ | 0.531 |
| (5) | Horizontal fillet welding of T-joint, current 300A, voltage 30 V, welding speed 65 cm/min, not preheated, shielding gas $CO_2$ | 1.979 |

TABLE 2

(Steel product, plate thickness, or weld metal according to the present invention are those other than those underlined)

| Steel | Plate thickness (mm) | Symbol for welding material | Symbol for welding conditions | $Q/h^2$ (Kcal/cm$^3$) | Angular distortion ($\times 10^2$ radian) | Other problem in welding |
|---|---|---|---|---|---|---|
| A | 12 | b | (5) | 0.72 | 0.40 | |
| A | 3 | c | (4) | 5.91 | 1.40 | |
| A | 5 | a | (3) | 3.47 | 0.93 | |
| B | 5 | a | (3) | 3.47 | 1.11 | |
| C | 5 | a | (3) | 3.47 | 1.30 | |
| <u>D</u> | 5 | <u>e</u> | (3) | 3.47 | 1.99 | Weld metal cracking |
| <u>E</u> | 5 | a | (3) | 3.47 | 1.60 | |
| F | 5 | b | (3) | 3.47 | 1.55 | |
| <u>G</u> | 5 | b | (3) | 3.47 | 1.65 | |
| <u>D</u> | 5 | f | (3) | 3.47 | 2.86 | Weld metal cracking |
| <u>E</u> | 5 | <u>e</u> | (3) | 3.47 | 3.88 | |
| F | 5 | <u>e</u> | (3) | 3.47 | 1.72 | |
| <u>G</u> | 5 | <u>e</u> | (3) | 3.47 | 4.10 | |
| B | 5 | b | (3) | 3.47 | 1.26 | |
| B | 5 | c | (3) | 3.47 | 1.35 | |
| <u>D</u> | 5 | <u>d</u> | (3) | 3.47 | 2.06 | Weld metal cracking |
| B | 5 | <u>e</u> | (3) | 3.47 | 1.59 | |
| B | 5 | f | (3) | 3.47 | 1.63 | |
| C | 8 | f | (1) | 3.49 | 1.58 | |
| C | <u>2</u> | a | (4) | 13.30 | 1.11 | Thermal buckling |
| A | 7 | b | (1) | 2.10 | 0.61 | |
| B | 6.5 | a | (5) | 4.69 | 1.35 | |
| A | 5 | a | (2) | 8.94 | 0.98 | |
| <u>E</u> | 5 | <u>g</u> | (2) | 8.94 | 2.33 | |
| <u>G</u> | 3 | f | (4) | 5.91 | 1.50 | |
| <u>E</u> | 7 | <u>e</u> | (1) | 2.10 | 2.01 | |
| <u>G</u> | 12 | <u>g</u> | (5) | 0.72 | 1.10 | |
| A | 25 | a | (2) | 0.36 | 0.01 | |
| A | 25 | <u>e</u> | (2) | 0.36 | 0.31 | |

Figure 3:
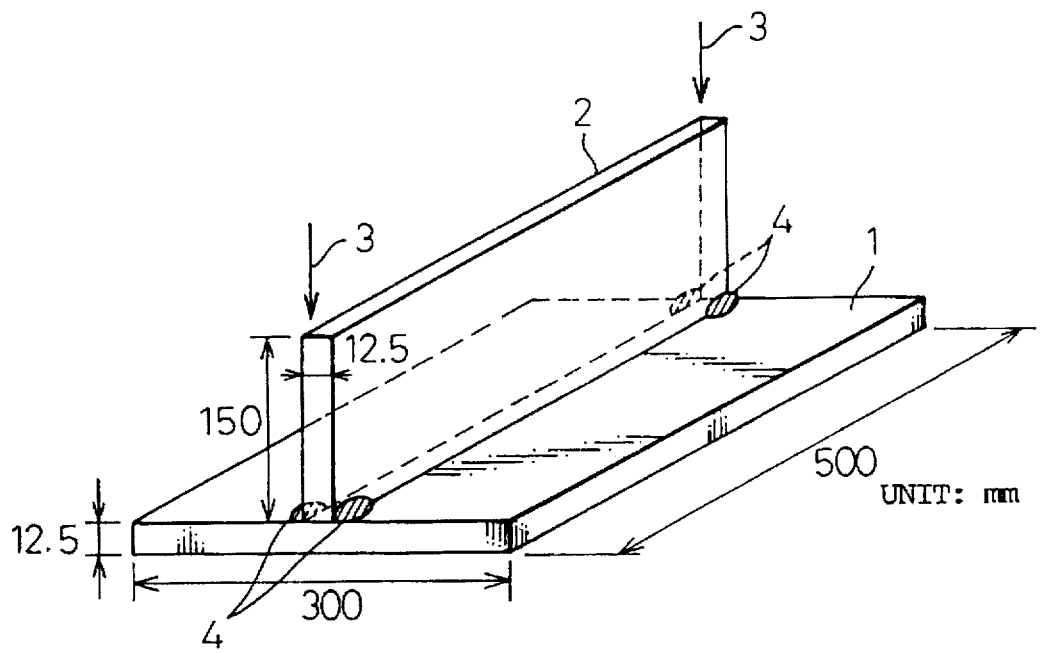
FIG. 3 is a perspective view of a fillet welded joint.
Figure 4:
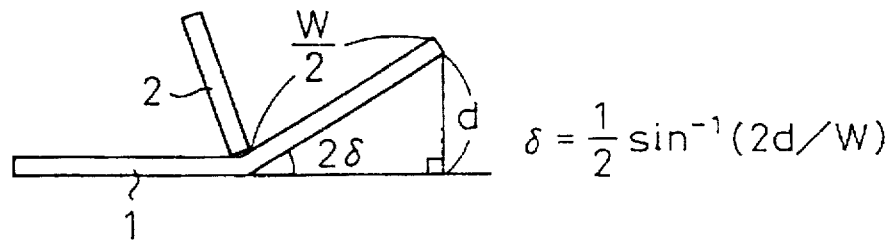
FIG. 4 is an explanatory view showing a method of calculating the angular distortion (δ)

The angular distortion in welding was measured on a specimen, as shown in FIG. 3, by a method as shown in FIG. 4. When the welding material was identical, the angular distortion for the steels A, B, C, and F of the present invention was smaller than that for the comparative steels D, E, and G. When the steel plate was identical, the angular distortion for the steel plates welded using the welding materials a, b, c, and f of the present invention were smaller than that for the steel plates welded using the comparative welding materials d, e, and g. Further, it is apparent that the angular distortion in welding, when the steel plates of the present invention were welded using the welding materials of the present invention, was much smaller than that for a combination of the comparative steel plate with the comparative welding material.

Figure 5:
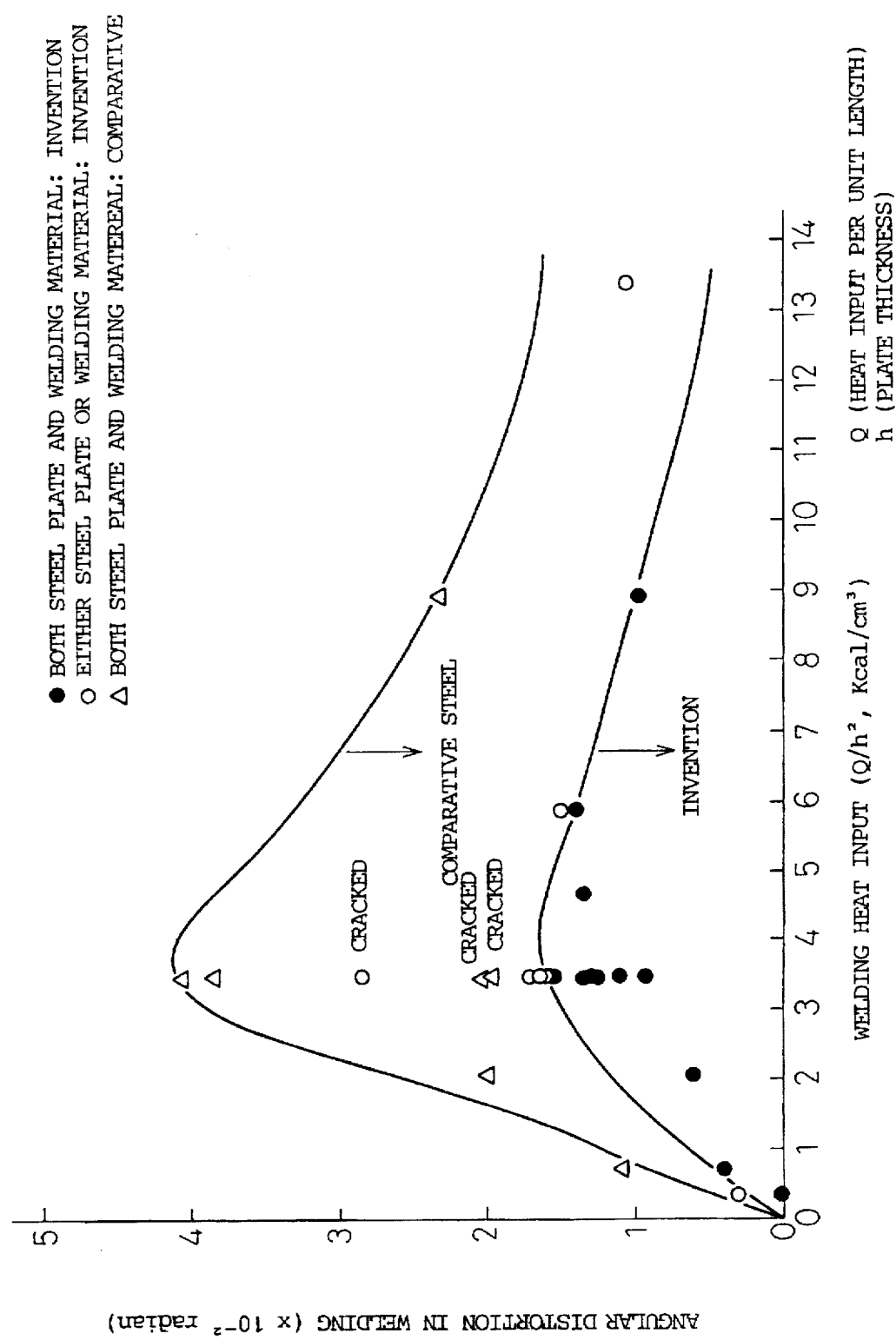
FIG. 5 is a diagram showing the relationship between the welding heat input ($Q/h^2$) and the angular distortion in welding.

FIG. 5 is a graph with the welding heat input ($Q/h^2$) plotted as abscissa against the angular distortion in welding as the ordinate, wherein the method of the present invention and the comparative method given in Table 2 are compared with each other.

$Q/h^2$ plotted as abscissa represents the heat input per unit volume determined by dividing the heat input per unit length by the square of the thickness. It is independent of the thickness and the welding method, and has a certain correlation with the angular distortion in welding (see a curve having a peak in $Q/h^2=3$ to 5 kcal/cm$^3$; A comparative materials).

In the drawing, the welding heat input shifts toward the left side of the graph with increasing the plate thickness h and decreasing the welding heat input O per unit length. The larger the thickness h of the plate, the higher the rigidity of the plate per se, and the smaller the welding heat input, the smaller the region where the yield stress is lowered by the heat applied during welding. Therefore, in these cases, the angular distortion in welding is decreased ($Q/h^2$<not more than 3 kcal/cm$^3$). On the other hand, the welding heat input shifts toward the right side of the graph with decreasing the plate thickness h and increasing the welding heat input O per unit length. Since the heat input is excessively large for the plate thickness, the temperature of the portion near the weld becomes so high that the whole surface in the plate thickness direction is brought to γ and the yield stress becomes substantially zero. Consequently, buckling is likely to occur. The buckling gives rise to concentrated plastic deformation, so that the angular distortion in welding per se becomes small.

As is apparent from FIG. 5, when both the steel plate and the welding material fall within the scope of the present invention, the angular distortion in welding is much smaller over the whole range of welding heat input than that when both the steel plate and the welding material are outside the scope of the present invention.

However, a satisfactory reduction in angular distortion in welding can be attained when either the steel plate or the welding material falls within the scope of the present invention.

Therefore, according to the present invention, at least when the steel plate is prepared so as to have a composition falling within the scope of the present invention, the yield stress ratio ($\sigma_{yT}/\sigma_y$) can be brought to a value falling within a range defined by the formulae (1) and (2). This enables the angular distortion in welding to be reduced to a much smaller value than that in the prior art.

A combination of the steel plate of the present invention with the welding material of the present invention can offer a better effect.

It has been confirmed that the steel plate of the present invention undergoes large angular distortion upon lineal heating and has excellent thermoplastic formability.

In the case of forming by lineal heating, lineal heating of the steel plate in a portion which is to be subjected to forming, such as bending, is followed by cooling and results in the formation of a tensile plastic forming region on the heated area.

Unlike welding, lineal heating, because the heat input is small, brings about a temperature rise only in the heated area and forms a plastic region only in that area. For this reason, the magnitude of the plastic forming is determined by the ratio of the yield stress of the steel plate in the heated area ($\sigma_{yT}$) to the yield stress of the steel plate in the non-heated area (room temperature) ($\sigma_y$). As the ratio ($\sigma_{yT}/\sigma_y$) approaches 1, the plastic strain introduced at that time of heating is increased and the bendability of the steel plate becomes better.

In the steel plate of the present invention, the plastic strain introduced at the time of heating is so large that the plastic formability produced by lineal heating is excellent.

Figure 6:
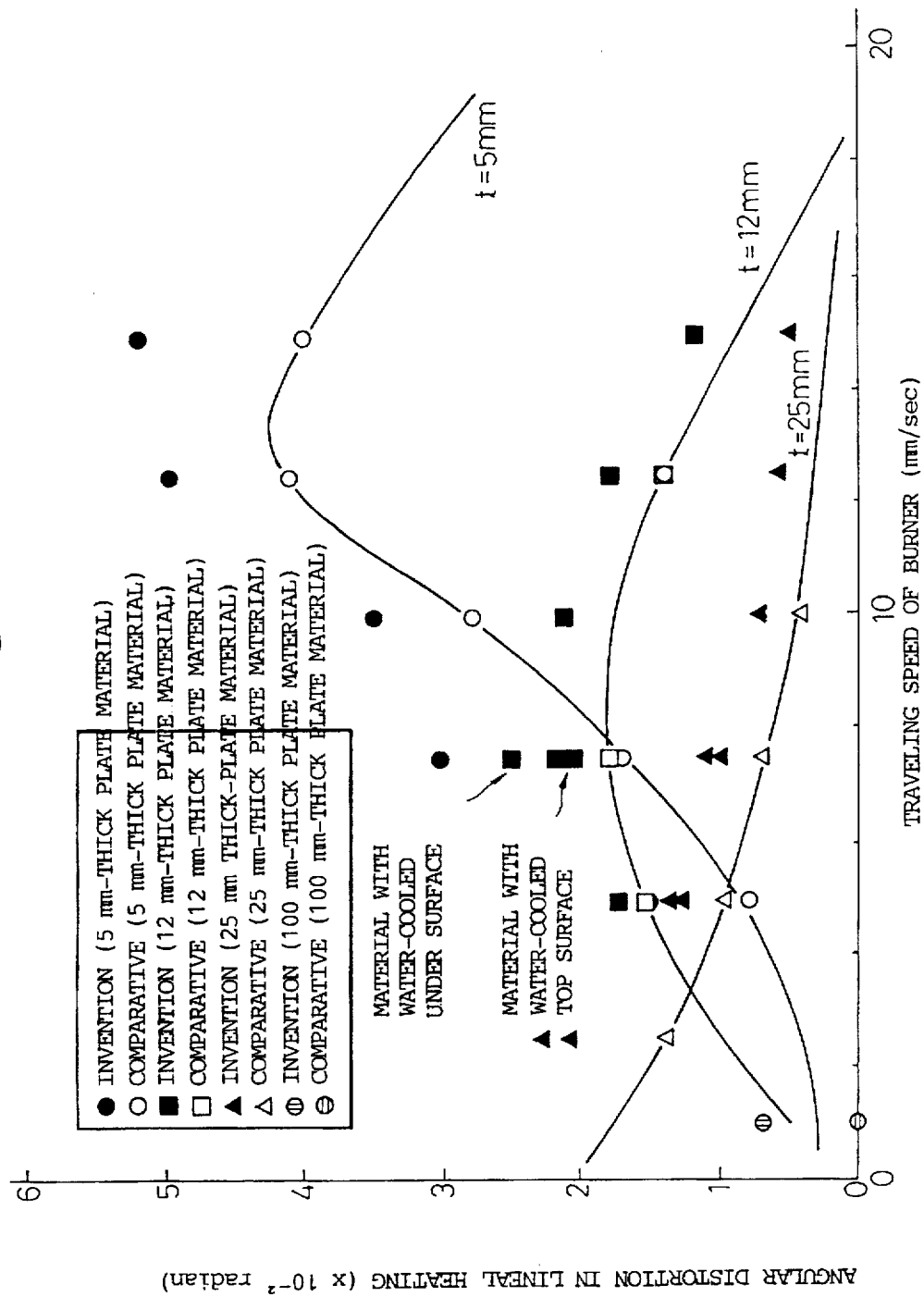
FIG. 6 is a diagram showing the relationship between the traveling speed of a burner and the angular distortion in lineal heating.

The angular distortion of steels of the present invention and comparative steels upon linear heating under conditions specified in Table 3 are given in Table 4. Comparison based on an identical plate thickness reveals that, for the steels prepared according to the process of the present invention, the plastic strain upon lineal heating is so large that the angular distortion is larger than that for the comparative steels. FIG. 6 shows the relationship between the traveling speed of a burner and the angular distortion. When comparison is made based on an identical plate thickness, the angular distortion upon lineal heating for the steels of the present invention is larger than that for the comparative steels in any traveling speed of the burner.

TABLE 3

| | |
|---|---|
| Oxygen pressure | 1.0 kg/cm$^2$ |
| Acetylene pressure | 0.1 kg/cm$^2$ (flow rate: 1770 liters/hr) |
| Bore diameter of nozzle | # 50 |
| Height of nozzle | 10 mm |
| Traveling speed of burner | 2.5 to 15 cm/sec |
| After heating | Air cooling, top surface: water cooling, under surface: water cooling (water cooling with hose, flow rate: 3 liters/mm) |

TABLE 4

| Steel | Plate thickness (mm) | Treatment after heating | Traveling speed of burner (mm/sec) | Angular distortion (×10$^{-2}$ radian) |
|---|---|---|---|---|
| A | 5 | Air cooling | 5 | 1.53 |
| D | 5 | Air cooling | 5 | 0.81 |
| B | 5 | Air cooling | 7.5 | 3.03 |
| B | 5 | Air cooling | 10 | 3.50 |
| E | 5 | Air cooling | 7.5 | 1.72 |
| E | 5 | Air cooling | 10 | 2.80 |
| G | 5 | Air cooling | 12.5 | 4.11 |
| G | 5 | Air cooling | 15 | 4.01 |
| C | 5 | Air cooling | 12.5 | 4.99 |
| F | 5 | Air cooling | 15 | 5.21 |
| A | 12 | Air cooling | 5 | 1.75 |
| B | 12 | Air cooling | 7.5 | 2.20 |
| C | 12 | Air cooling | 10 | 2.15 |
| F | 12 | Air cooling | 12.5 | 1.81 |
| B | 12 | Air cooling | 15 | 1.21 |
| D | 12 | Air cooling | 5 | 1.55 |
| E | 12 | Air cooling | 7.5 | 1.80 |
| G | 12 | Air cooling | 12.5 | 1.41 |
| A | 25 | Air cooling | 2.5 | 2.30 |
| B | 25 | Air cooling | 5 | 1.30 |
| C | 25 | Air cooling | 7.5 | 1.01 |
| F | 25 | Air cooling | 10 | 0.75 |
| A | 25 | Air cooling | 12.5 | 0.61 |
| A | 25 | Air cooling | 15 | 0.52 |

TABLE 4-continued

| Steel | Plate thickness (mm) | Treatment after heating | Traveling speed of burner (mm/sec) | Angular distortion (×10⁻² radian) |
|---|---|---|---|---|
| B | 25 | Air cooling | 2.5 | 2.10 |
| C | 25 | Air cooling | 5 | 1.39 |
| F | 25 | Air cooling | 7.5 | 1.15 |
| <u>D</u> | 25 | Air cooling | 2.5 | 1.41 |
| <u>E</u> | 25 | Air cooling | 5 | 1.00 |
| <u>G</u> | 25 | Air cooling | 7.5 | 0.72 |
| <u>D</u> | 25 | Air cooling | 10 | 0.45 |
| B | 12 | Top surface: water cooling | 7.5 | 2.09 |
| B | 12 | Under surface: water cooling | 7.5 | 2.53 |
| B | 100 | Air cooling | 1.0 | 0.71 |
| <u>D</u> | 100 | Air cooling | 1.0 | 0.02 |

Note: The underlined items are outside the scope of the present invention.

The reasons for the limitation of chemical compositions of the steel of the present invention which can offer the above effects will be described.

C is an indispensable element for strengthening steel products. When the C content is less than 0.02%, high strength contemplated in the present invention cannot be provided. On the other hand, it exceeds 0.25%, the toughness of the weld is deteriorated. For this reason, the C content is limited to 0.02 to 0.25%.

Si is an element which is effective for accelerating deoxidation and enhancing the strength. For this purpose, it is added in an amount of not less than 0.01%. Since, however, the addition of Si in an excessive amount results in deteriorated weldability, the upper limit of the amount of Si added is 2.0%.

Mn is an element which is effective for improving the low-temperature toughness. For this purpose, it is added in an amount of not less than 0.30%. The addition of Mn in an amount exceeding 1.5%, however, accelerates weld cracking and leads to the possibility of the yield stress at room temperature becoming excessive. For this reason, the upper limit of the amount of Mn added is 1.5%.

Al is effective as a deoxidizer and may be added in an amount of not less than 0.003%. However, since the addition of Al in an excessive amount results in the formation of an inclusion harmful to the quality, the upper limit of the amount of Al added is 0.10%.

Nb serves to enhance the yield stress through precipitation during welding heat history, resulting in a great effect of suppressing angular distortion in welding. When the amount of Nb added is excessively small, the precipitation strengthening is unsatisfactory. For this reason, Nb is added in an amount of not less than 0.005%. The addition of Nb in an excessive amount, however, results in excessively high yield stress at room temperature and is disadvantageous from the viewpoint of suppressing the angular distortion in welding. Therefore, the amount of Nb added is not more than 0.10%, preferably not more than 0.025%.

Mo, as with Nb, serves to enhance the yield stress through precipitation during welding heat history and, hence, has a great effect of suppressing the angular distortion in welding. A synergistic effect attained by the addition of Mo in combination with Nb is useful for suppressing the angular distortion in welding. In an early stage of welding heat history, Nb, which is precipitated relatively rapidly, functions effectively, while in the latter half stage, Mo, which is precipitated relatively late, functions effectively. When the amount of Mo added is excessively small, the precipitation strengthening is unsatisfactory. For this reason, Mo is added in an amount of not less than 0.05%. The addition of Mo in an excessive amount, however, results in excessively high yield stress at room temperature and is disadvantageous from the viewpoint of suppressing the angular distortion in welding. Therefore, the amount of Mo added is not more than 1.00%, preferably not more than 0.25%.

Ti, even when added in a very small amount, effectively acts on refinement of grains. For this purpose, it is added in an amount of not less than 0.001%. Since, however, the addition of Ti in an excessive amount results in deteriorated toughness in the weld, the upper limit of the amount of Ti added is 0.10%.

Cu, Ni, Cr, Co, and W, when added to the steel of the present invention, all serve to increase the strength of the steel through solid solution strengthening. For this purpose, they may be added in an amount of not less than 0.05%. Since, however, the addition thereof in an excessive amount results in deteriorated weldability and, further, results in excessive yield stress at room temperature, the upper limit of the amount of these elements added is 2.0% for Cu, 3.5% for Ni, 1.5% for Cr, and 0.5% for Co and W. However, the amount of Cu and Ni added is preferably not more than 1.5%.

V is effective in increasing the strength through precipitation effect and serves to enhance the effect of suppressing the welding strain. It is added in an amount of not less than 0.02%. However, since the addition of V in an excessive amount results in deteriorated toughness, the upper limit of the amount of V added is 0.10%.

B is known as an element for improving the hardenability and, when added to the steel of the present invention, can enhance the strength of the steel. For this purpose, it is added in an amount of not less than 0.0002%. However, since the addition of B in an excessive amount increases the precipitate and consequently results in deteriorated toughness, the upper limit of B added is 0.0025%.

Rem and Ca are useful for rendering S harmless. For this purpose, Rem and Ca are added in respective amounts of not less than 0.002% and not less than 0.0003%. However, since the addition of Rem and Ca in an excessive amount results in deteriorated toughness, the upper limits of the amount of Rem and Ca added are 0.10% and 0.0040%, respectively.

The process for producing a predetermined thickness of a steel plate having the above composition will be described.

A molten steel having the above composition is poured into a casting machine, the cast steel ingot or slab is rolled either directly before the temperature is lowered to below 1100° C. or after reheating to 1100° C. or above. This is because the precipitation of Nb in combination with Mo according to the temperature rise in the course of welding to suppress a lowering in yield stress is necessary in order to attain the object of the present invention, i.e., to prevent welding distortion. That is, the content of Nb and Mo in a solid solution form in the steel plate in the above high temperature region is ensured to enable the precipitation strengthening during welding heat history.

For this purpose, after casting, the steel ingot or slab is rolled directly before the temperature is lowered to below 1100° C. Alternatively, it may be rolled after reheating to 1100° C. or above. When the temperature is below 1100° C., Nb begins to precipitate, making it impossible to ensure the necessary amount of the solid solution.

In order to suppress the occurrence of precipitation during rolling, the rolling termination temperature should be as high as possible. When the temperature of the plate is below 850° C., the precipitation of Nb becomes significant, so that the lower limit of the rolling temperature is 850° C. Further, rolling at a temperature of 900° C. or below accelerates the precipitation of Nb due to working-induced precipitation. For this reason, the total reduction ratio at a temperature of 900° C. or below is preferably limited to not more than 50%.

After the rolling, the steel plate may be allowed to stand for cooling. Cooling to 500° C. or below immediately after the completion of rolling enables the formation of a larger amount of solid solution to be ensured. Since, however, cooling to below 200° C. causes the yield stress at room temperature to become excessive and to easily exceed 36 kgf/mm², the lower limit of the cooling temperature is 200° C. When the cooling rate is less than 1° C./sec, no cooling effect can be attained. On the other hand, when it exceeds 40° C./sec, the yield stress at room temperature becomes excessively high. For this reason, the cooling rate is limited to 1 to 40° C./sec.

The composition of the welding material which can provide the above deposited metal will now be described.

In a cooling rate range in the conventional arc welding, the α-γ transformation temperature (Ar₃ transformation temperature) $T_F$ (° C.) can be roughly estimated by the following formula (3). As is apparent from the formula (3), the Ar₃ transformation temp. can be lowered by adding Ni, Mn, Cu, Nb, and C as a γ former in a predetermined amount. In general, the transformation expansion increases with decreasing the transformation temperature, contributing to relaxation of residual distortion in welding caused by contraction upon cooling. Therefore, it is considered that an increase in transformation expansion contributes to a reduction in welding distortion. Since, however, the transformation of supercooled austenite does not simply show clear correlation with the transformation expansion due to the appearance of a bainite structure or the like, the present inventors have aimed at the Ar₃ transformation temperature.

$$T_F(°C.) = 630 - 476.5C + 56Si - 19.7Mn - 16.3Cu - 26.6Ni - \quad (3)$$
$$4.9Cr + 38.1Mo + 124.8V + 136.3Ti - 19.1Nb + 198.4Al + 3315B$$

Figure 7:
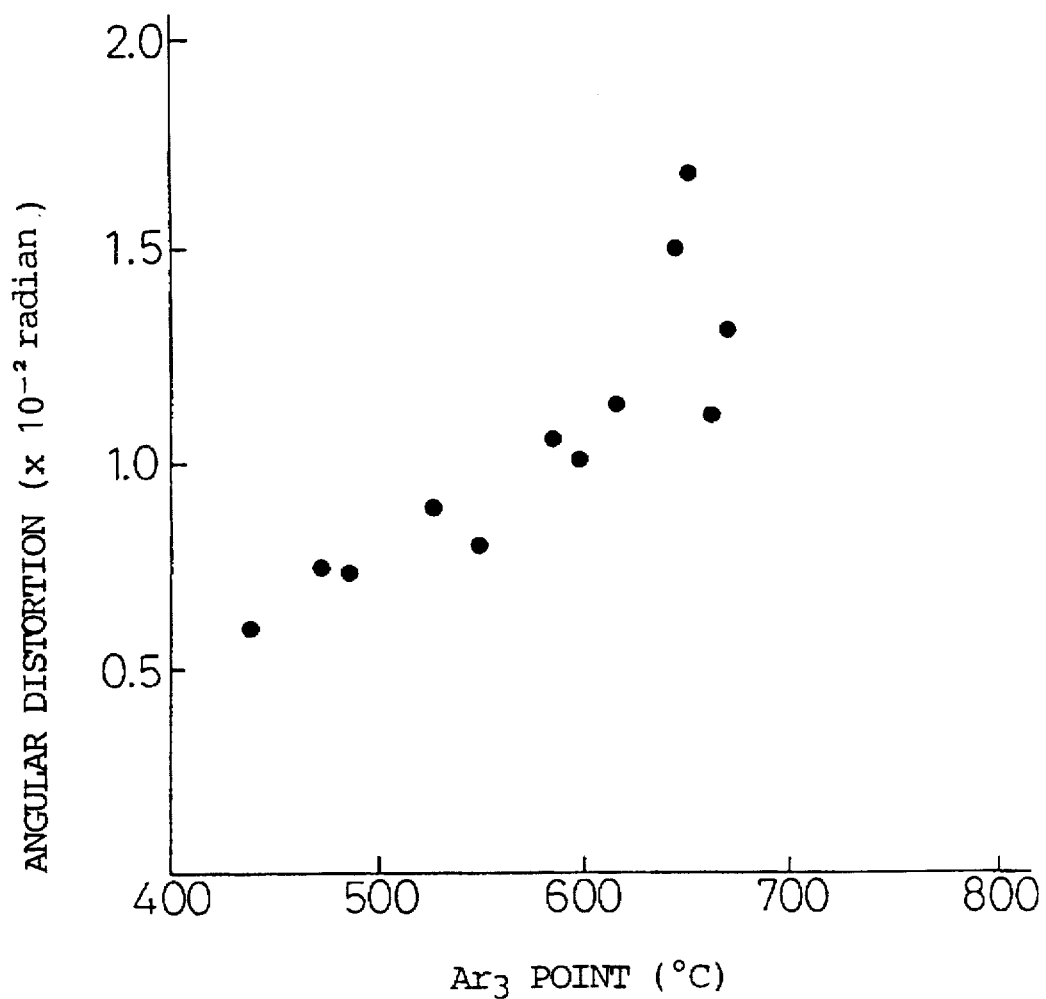
FIG. 7 is a diagram showing the relationship between the transformation temperature and the angular distortion.

On the other hand, it has been found that, as shown in FIG. 7, the angular distortion created in a Tee-type fillet welded joint has clear correlation with the Ar₃ transformation temperature of the welding material and the angular distortion decreases with decreasing the transformation temperature. The reason for this is believed to reside in that a lowering in transformation temperature increases the transformation expansion resulting in elimination of contraction associated with the solidification to some extent. Further, it has been found that when elements Cr, Mo, Nb, and V are added in addition to Ni, Mn, Cu, and C as the γ former, the angular distortion created is small even though the γ₃ transformation temperature $T_F$ provided by the formula (3) is somewhat higher than that in the case of a welding material free from Cr, Mo, Nb, and V. This is probably because all Cr, Mo, Nb, and V can increase the mechanical strength at the transformation temperature, resulting in restraint of distortion. The following relational expression (6) with respect to the transformation temperature for providing the limit value of angular distortion requiring no straightening operation has been established based on the fact that welding distortion results in deteriorated buckling resistance to compressive load as well as the results of a study on dimensional accuracy in the production of joints while taking into consideration the influence of the addition of elements Cr, Mo, Nb, and V:

$$T_F < 620° C. \quad (6)$$

When a welding material having the above γ₃ transformation temperature is used welding such as submerged arc welding, the resultant deposited metal has a yield stress ratio $(\sigma_{y0T0}/\sigma_{y0})$ as shown in FIG. 2, enabling the angular distortion in welding to be satisfactorily lowered.

Elements constituting the welding wire of the present invention and the contents thereof will be described. The content of the element is in % by weight based on the total weight of the wire.

C has the effect of lowering the transformation point and should be added in an amount of not less than 0.03% also from the viewpoint of strength. However, the addition of C in an excessive amount leads to increased susceptibility to high temperature cracking and deteriorated toughness of weld metal. For this reason, the upper limit of the amount of C added is 0.15%, preferably 0.09%.

Si serves to reduce the content of oxygen in the weld metal and, in addition, has the effect of improving the shape of the resultant bead. It should be added in an amount of not less than 0.2% for this purpose. However, since the addition of Si in an excessive amount results in deteriorated toughness of weld metal, the upper limit of the amount of Si added is 1.0%.

Mn serves to greatly lower the transformation point and should be added, as an assistant for Ni, in an amount of at least 0.3%, preferably at least 0.8%. However, since the addition of Mn in an excessive amount leads to increased susceptibility to high temperature cracking and deteriorated toughness of weld metal, the upper limit of the amount of Mn added should be 3.0%.

Ni is a representative γ former and has a great effect of lowering the transformation point. For this purpose, it should be added in an amount of at least 0.2%. The addition of Ni in an excessive amount, however, incurs an increase in cost, so that the upper limit of the amount of Ni added is 9.0%. However, in the case of, for example, offshore structures, the weld metal becomes electrically excessively noble, forming a local battery. This unfavorably causes the weld heat-affected zone to be selectively corroded. For this reason, the upper limit of the amount of Ni added is preferably 5.0%.

The above elements have the effect of lowering the transformation point. The welding material may contain, besides the above elements, the following elements for increasing the strength in a temperature region where the transformation occurs.

Cu should be added in an amount of not less than 0.1% when the effect of lowering the transformation point is contemplated. However, since the addition of Cu in an excessive amount leads to deteriorated toughness of weld metal, the upper limit of the amount of Cu added is 1.5%.

Cr should be added in an amount of not less than 0.1% when the effect of increasing the strength is contemplated. When the amount of Cr added is excessively large, the cold strength and hardness are increased resulting in deteriorated toughness. Further, in this case, the weldability too is deteriorated. The upper limit of the amount of Cr added is 3.0%.

Mo should be added in an amount of not less than 0.1% from the viewpoint of strength. However, since the effect of increasing the transformation temperature is large, the upper limit of the amount of Mo added is 2.0%.

V also, when added in an amount of not less than 0.1%, has the effect of increasing the strength. The addition of V in an excessive amount, however, increases the cold strength and hardness and consequently deteriorates the toughness, resulting in increased transformation temperature. For this reason, the upper limit of the amount of V added is 0.7%.

Nb too, when added in an amount of not less than 0.01%, has the effect of increasing the strength. However, the addition of Nb in an excessive amount increases the cold strength and hardness. For this reason, the upper limit of the amount of Nb added is 0.5%. Further, the upper limit is preferably 0.05% from the viewpoint of preventing the deterioration of toughness.

Means for decreasing the angular distortion created in welding has been described above. The present inventors have also studied the composition of a slag forming agent with a view to improving the final bead shape (expansion of the field of utilization). As a result, it has been found that the utilization of a slag forming agent enables an improvement in bead shape after welding and a marked reduction in spatter loss at the time of welding.

Based on the above finding, the present inventors have limited the constituents for the above purpose as follows.

$TiO_2$: 2.5 to 6.5%

$TiO_2$ is a constituent indispensable for enhancing the stability of the arc and the covering property of the slag. When the $TiO_2$ content is less than 2.5%, the contemplated effect cannot be attained. On the other hand, when it exceeds 6.5%, the viscosity of the slag becomes so high that the bead shape is deteriorated. Further, in this case, excessive reduced titanium stays in the weld metal to deteriorate the mechanical properties (particularly toughness).

Oxides other than $TiO_2$: 0.3 to 2.5%

Oxides other than $TiO_2$ include $SiO_2$, $Al_2O_3$, $ZrO_2$, MnO, MgO, FeO, and $Fe_2O_3$. They can regulate the viscosity of the slag and, at the same time, improve the appearance and shape of the bead. In addition, they can improve all position weldability. When the content of these oxides is less than 0.3%, the above effects are unsatisfactory. On the other hand, when it is excessively high, the viscosity of the melted slag becomes remarkably low, resulting in remarkably deteriorated weldability. For this reason, the upper limit of the content of the above oxides other than $TiO_2$ should be 2.5%.

The present inventors have made studies on, besides the improvement in bead shape, an improvement in the deposition rate with a view to enhancing the welding efficiency. As a result, it has been found that the utilization of an iron powder can improve the bead shape after welding to reduce the amount of spatter and, at the same time, results in markedly improved deposition rate.

Based on the above finding, the present inventors have limited the constituents for the above purpose as follows.

Iron powder: 4.0 to 12.0%

In order to satisfactorily attain the effect of improving the welding efficiency, which is a feature of a metallic powder flux-cored wire, the iron powder should be added in an amount of not less than 4.0%. When the amount of the iron powder added is less than 4.0%, the wire deposition rate become so low that the welding efficiency is lowered. On the other hand, when it exceeds 12.0%, the absolute quantity of other constituents in the flux, for example, a slag forming agent, a deoxidizer, and an alloying agent, becomes insufficient, deteriorating the bead shape or making it impossible to provide contemplated strength. For the above reason, the amount of the iron powder added is limited to 4.0 to 12.0%.

Arc stabilizer: 0.05 to 1.1%

In the wire composed mainly of an iron powder according to the present invention, the addition of an arc stabilizer is necessary in order to stabilize the arc, thereby reducing the amount of spatter. When the amount of the arc stabilizer added is less than 0.05%, the contemplated effect as the arc stabilizer cannot be attained. On the other hand, when it exceeds 1.1%, the length of the arc become so large that the transferability of droplets is inhibited resulting in increased spatter loss. For this reason, the amount of the arc stabilizer added is limited to 0.05 to 1.1%. Examples of the arc stabilizer include alkali metals, such as Li, Na, and K, and compounds thereof.

Slag forming agent: 0.3 to 3.5%

The slag forming agent is added in order to improve the bead shape. The amount of the slag forming agent added should be such as will not sacrifice the deposition rate. When it is less than 0.3%, the effect of improving the bead shape cannot be attained. On the other hand, when it exceeds 3.5%, the amount of the slag is increased, leading to defects, such as slag inclusion, or deteriorated welding efficiency. For this reason, the amount of the slag forming agent except for the arc stabilizer is limited to 0.3 to 3.5%. Slag forming agents usable in the present invention include oxides such as $TiO_2$, $SiO_2$, $ZrO_2$, $Al_2O_3$, MnO, and MgO; fluorides such as $CaF_2$, $BaF_2$, $MgF_2$, and LiF; and carbonates such as $CaCO_3$, $BaCO_3$.

In addition, the flux filling ratio of the wire according to the present invention is preferably 4 to 20% regardless of whether or not the iron powder is used. The reason for this is as follows. When the filling ratio exceeds 20%, breaking of the wire frequently occurs at the time of wire drawing, deteriorating the productivity. On the other hand, when it is less than 4%, the arc stability is deteriorated.

The sectional form of the wire is not particularly limited and, in the case of a small diameter of not more than 2 mm, is, in general, relatively simple, i.e., cylindrical. Further, for a seamless wire, plating of the surface of the wire with Cu or the like is also effective.

Also in the case of the use of the above steel product in combination with the above welding material, $Q/h^2$, wherein h represents plate thickness, cm, and Q represents welding heat input, cal/cm, is preferably not more than 3.0 kcal/cm$^3$ because the effect of reducing the distortion becomes better when $Q/h^2$ is not more than 3.0 kcal/cm$^3$.

EXAMPLES

Example 1

At the outset, steels comprising having chemical compositions specified in Table 5 were used to prepare steel plates under production conditions specified in Table 6. These steel plates were welded under conditions specified in Table 7. The angular distortion created in the welding was as given in Table 8. From Table 8, it is apparent that the steels according to the present invention have very small angular distortion in welding. The angular distortion in welding was measured using a specimen as shown in FIG. 3 by a method as shown in FIG. 4.

Specifically, the specimen was prepared by putting steel 2 of the present invention vertically on steel plate 1 of the present invention, restraining (3) both ends of steel plate 2, and conducting tack welding 4 (four places) at both ends of the two steel plates in contact with each other.

After the completion of welding, w (plate thickness) and d shown in FIG. 4 were measured, and the angular distortion 6 was determined by the following formula (7):

$$\delta = 0.5 \sin^{-1}(2d/w) \tag{7}$$

Figure 8:
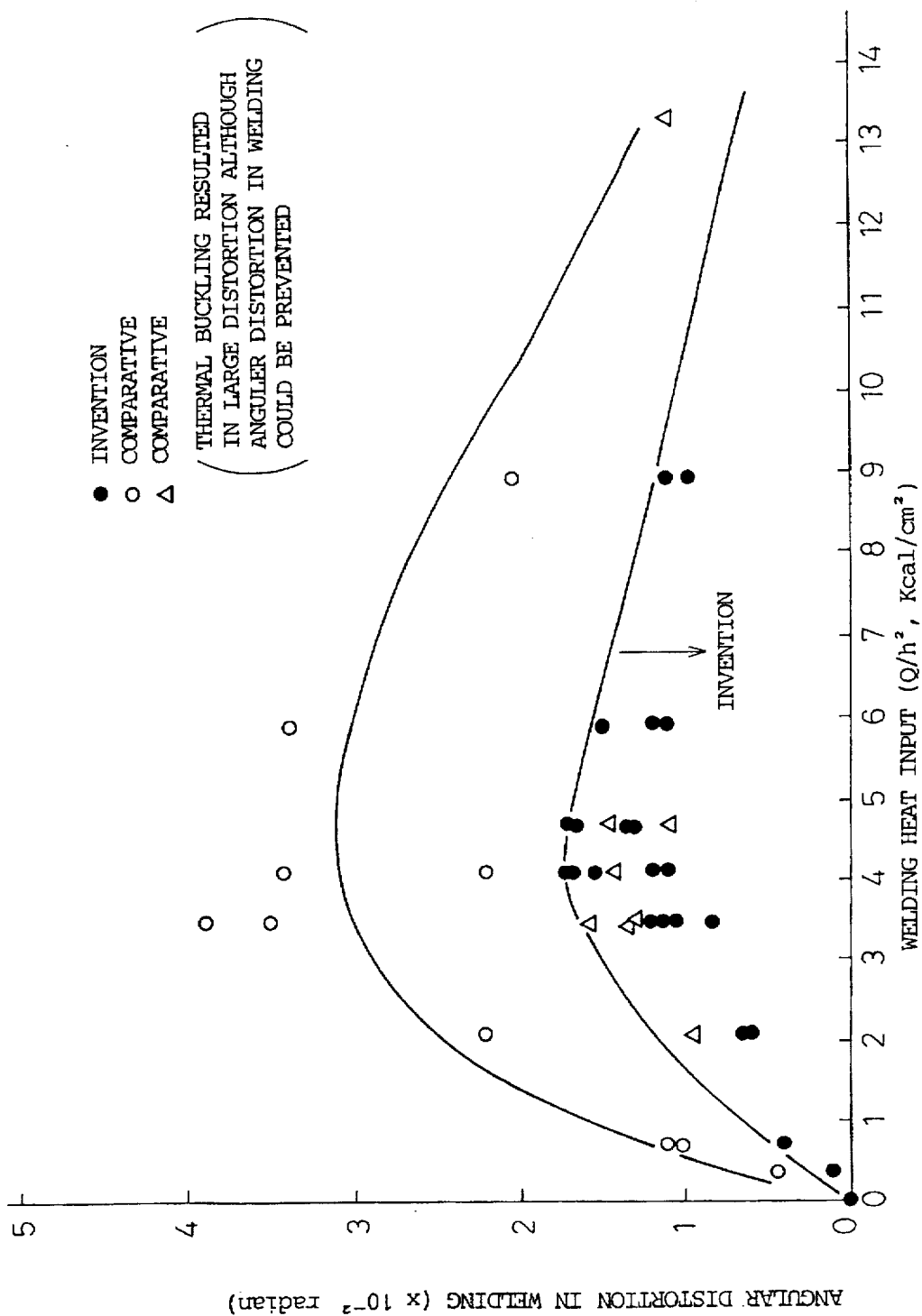
FIG. 8 is a diagram showing the relationship between the welding heat input (Q/h$^2$) and the angular distortion in welding in a working example in the present specification.

The results are given in Table 8. When an identical welding material was used, the angular distortion of the steels according to the present invention was smaller than that of the comparative steels. In FIG. 8, $Q/h^2$ is plotted as abscissa to compare the angular distortion in welding of the steel of the present invention with that of the comparative steel. The steel of the present invention had a suppressed angular distortion in welding under all the welding conditions in terms of $Q/h^2$.

Figure 9:
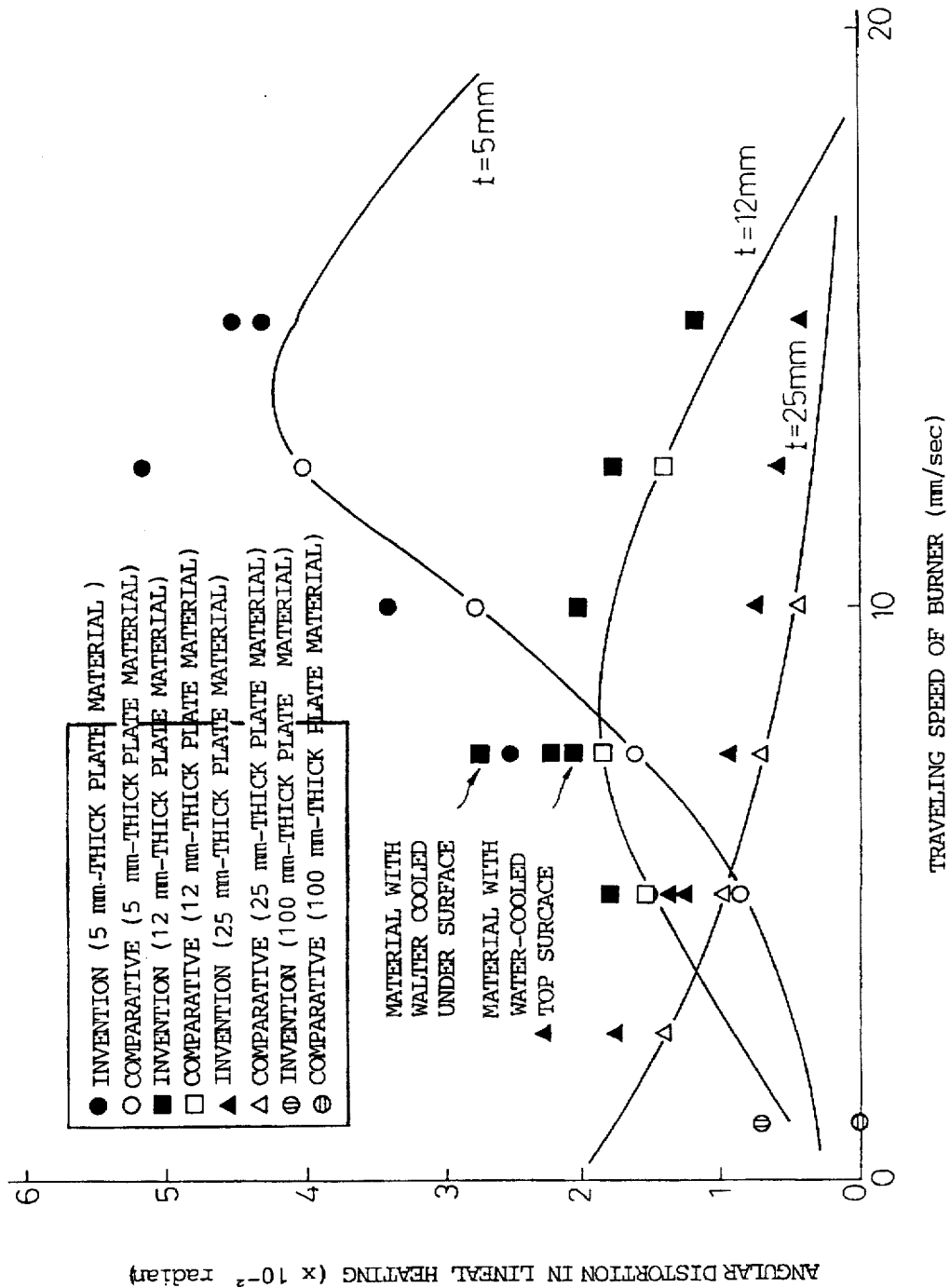
FIG. 9 is a diagram showing the relationship between the traveling speed of a burner and the angular distortion in lineal heating in a working example in the present specification.

Table 9 shows the results of measurement of angular distortion when lineal heating is carried out under heating conditions specified in Table 10. When comparison is made based on an identical plate thickness, the angular distortion in lineal heating for the steels of the present invention was larger than that for the comparative steels. FIG. 9 shows the relationship between the traveling speed of a burner and the angular distortion. When comparison is made based on an identical plate thickness, the angular distortion in lineal heating for the steels of the present invention was larger than that for the comparative steels at all the traveling speeds of the burner.

TABLE 5

(wt %)

| Type of steel | C | Si | Mn | Al | Ti | Nb | Cu | Ni | Cr | Mo | Co | W | V | B | Rem | Ca | Classification |
|---|---|---|---|---|---|---|---|---|---|---|---|---|---|---|---|---|---|
| A | 0.10 | 0.20 | 1.30 | 0.020 | | 0.011 | | | | 0.06 | | | | | | | Steel of inv. |
| B | 0.09 | 0.25 | 1.18 | 0.005 | | 0.024 | | | | 0.22 | | | | | | 0.0008 | Steel of inv. |
| C | 0.11 | 0.16 | 1.35 | 0.080 | | 0.006 | | | | 0.24 | | | | | 0.0041 | | Steel of inv. |
| D | 0.22 | 0.06 | 0.33 | 0.007 | | 0.006 | | | | 0.18 | | | | | | | Steel of inv. |
| E | 0.10 | 0.21 | 1.25 | 0.030 | | 0.012 | | 0.40 | | 0.20 | | | | | | | Steel of inv. |
| F | 0.09 | 0.20 | 1.28 | 0.030 | | 0.022 | | | | 0.83 | | | | | | | Steel of inv. |
| G | 0.10 | 0.21 | 1.22 | 0.033 | | <u><0.001</u> | | | | 0.25 | | | | | | | Comp. steel |
| H | 0.10 | 0.18 | 1.30 | 0.018 | | 0.016 | | | | <u><0.001</u> | | | | | | | Comp. steel |
| I | 0.09 | 0.19 | 1.21 | 0.030 | | 0.020 | | | | <u>1.10</u> | | | | | | | Comp. steel |
| J | 0.08 | 0.20 | 1.50 | 0.030 | 0.015 | 0.009 | | | | 0.25 | | | | | | | Steel of inv. |
| K | 0.07 | 0.21 | 1.49 | 0.026 | | 0.022 | | | | 0.09 | | | 0.068 | | | | Steel of inv. |
| L | 0.11 | 0.16 | 0.30 | 0.005 | | 0.009 | | | | 0.18 | 0.22 | | | | | | Steel of inv. |
| M | 0.10 | 0.45 | 1.00 | 0.069 | | 0.013 | | 0.33 | 0.13 | 0.15 | | | 0.026 | 0.0011 | | | Steel of inv. |
| N | 0.10 | 0.33 | 0.96 | 0.011 | | 0.015 | 0.22 | 1.20 | 0.34 | 0.20 | | | | | | | Steel of inv. |
| O | 0.11 | 0.30 | 1.01 | 0.015 | | 0.015 | 1.90 | 1.00 | 0.33 | 0.20 | | | | | | | Steel of inv. |
| P | 0.10 | 0.31 | 1.00 | 0.014 | | 0.013 | 0.20 | 3.30 | 0.33 | 0.20 | | | | | | | Steel of inv. |
| Q | 0.05 | 0.18 | 1.46 | 0.055 | | 0.008 | | | | 0.15 | | 0.11 | | | | | Steel of inv. |
| R | 0.14 | 0.16 | 1.35 | 0.071 | | 0.010 | | | 0.20 | <u><0.001</u> | | | 0.041 | 0.0009 | | 0.0010 | Comp. steel |
| S | 0.10 | 0.45 | 1.00 | 0.075 | | <u>0.110</u> | | | | 0.18 | | | | | | | Comp. steel |
| T | 0.10 | 0.30 | 0.98 | 0.015 | | 0.016 | <u>2.20</u> | 3.20 | 0.32 | 0.18 | | | | | | | Comp. steel |
| U | 0.10 | 0.31 | 1.02 | 0.015 | | 0.015 | 1.72 | <u>3.61</u> | 0.33 | 0.20 | | | | | | | Comp. steel |
| V | 0.10 | 0.44 | 1.01 | 0.073 | | 0.063 | | | | 0.19 | | | | | | | Steel of inv. |

Note: The underlined items are outside the scope of the present invention.

TABLE 6

| Symbol for production conditions | Direct rolling or rolling with reheating | Reheating temp. (°C.) (rolling initiation temp. for direct rolling) | Rolling termination temp. (°C.) | Cooling rate after rolling (°C./S) | Cooling termination temp. (°C.) | |
|---|---|---|---|---|---|---|
| a | Direct rolling | 1250 | 920 | Standing for cooling | | Inv. |
| b | Direct rolling | <u>1050</u> | 865 | Standing for cooling | | Comp. |
| c | Direct rolling | 1220 | 875 | 22 | 450 | Inv. |
| d | Rolling with reheating | 1100 | 880 | Standing for cooling | | Inv. |
| e | Rolling with reheating | <u>1050</u> | 876 | Standing for cooling | | Comp. |
| f | Rolling with reheating | 1150 | <u>830</u> | 27 | 430 | Comp. |
| g | Rolling with reheating | 1200 | 865 | 22 | <u>180</u> | Comp. |
| h | Rolling with reheating | 1200 | 910 | <u>45</u> | 450 | Comp. |
| i | Rolling with reheating | 1200 | 881 | 21 | 425 | Inv. |
| j | Rolling with reheating | 1150 | 920 | 4 | 250 | Inv. |

Note: The underlined items are outside the scope of the present invention.

TABLE 7

| Symbol for welding conditions | Welding conditions | Heat input per unit length (kJ/cm) |
|---|---|---|
| (1) | Horizontal fillet welding of T-joint, current 240A, voltage 24 V, welding speed 80 cm/min, not preheated, welding materials SF-1, shielding gas $CO_2$ | 4.32 |
| (2) | Horizontal fillet welding of T-joint, current 180A, voltage 26 V, welding speed 30 cm/min, not preheated, welding materials SF-1, shielding gas $CO_2$ + Ar | 9.36 |
| (3) | Horizontal fillet welding of T-joint, current 220A, voltage 22 V, welding speed 80 cm/min, not preheated, welding materials SF-1, shielding gas $CO_2$ | 3.63 |
| (4) | Horizontal fillet welding of T-joint, current 220A, voltage 22 V, welding speed 130 cm/min, not preheated, shielding gas $CO_2$, welding materials SM-1, | 2.23 |
| (5) | Horizontal fillet welding of T-joint, current 300A, voltage 30 V, welding speed 65 cm/min, not preheated, shielding gas $CO_2$, welding mterials SM-1, | 8.31 |

TABLE 8

| Steel | Plate thickness (mm) | Symbol for welding material | Symbol for welding conditions | $Q/h^2$ (Kcal/$cm^3$) | Angular distortion ($\times 10^2$ radian) | Other poor weld |
|---|---|---|---|---|---|---|
| B | 12 | a | (5) | 0.72 | 0.40 | |
| B | 3 | _b_ | (4) | 5.91 | 3.40 | |
| B | 5 | c | (3) | 3.47 | 0.83 | |
| B | 5 | d | (3) | 3.47 | 1.20 | |
| B | 5 | _e_ | (3) | 3.47 | 3.51 | |
| B | 5 | _f_ | (3) | 3.47 | 3.89 | |
| B | 5 | _g_ | (3) | 3.47 | 1.58 | Thermal buckling |
| B | 5 | h | (3) | 3.47 | 1.35 | |
| B | 5 | i | (3) | 3.47 | 1.16 | |
| B | 5 | j | (3) | 3.47 | 1.07 | |
| A | 5 | d | (1) | 4.12 | 1.22 | |
| C | 5 | d | (1) | 4.12 | 1.09 | |
| D | 5 | d | (1) | 4.12 | 1.11 | |
| E | 5 | d | (1) | 4.12 | 1.21 | |
| F | 5 | d | (1) | 4.12 | 1.50 | |
| _G_ | 5 | d | (1) | 4.12 | 2.21 | |
| _H_ | 5 | d | (1) | 4.12 | 3.43 | |
| _I_ | 8 | i | (2) | 3.49 | 1.31 | Thermal buckling |
| J | _2_ | j | (4) | 13.30 | 1.11 | Thermal buckling |
| J | 7 | c | (1) | 2.10 | 0.60 | |
| K | 6.5 | d | (5) | 4.69 | 1.35 | |
| L | 5 | d | (2) | 8.94 | 0.98 | |
| M | 5 | i | (2) | 8.94 | 1.12 | |
| N | 3 | _j_ | (4) | 5.91 | 1.51 | |
| O | 5 | d | (1) | 4.12 | 1.70 | |
| P | 5 | d | (1) | 4.12 | 1.72 | |
| Q | 7 | j | (1) | 2.10 | 0.63 | |
| _R_ | 12 | d | (5) | 0.72 | 1.10 | |
| _S_ | 7 | c | (1) | 2.10 | 0.95 | Thermal buckling |
| _T_ | 6.5 | d | (5) | 4.69 | 1.10 | Thermal buckling |
| _U_ | 6.5 | d | (5) | 4.69 | 1.48 | Thermal buckling |
| V | 6.5 | d | (5) | 4.69 | 1.60 | |
| L | 5 | _f_ | (2) | 8.94 | 2.05 | |
| C | 12 | _e_ | (5) | 0.72 | 1.01 | |
| D | 5 | _g_ | (1) | 4.12 | 1.45 | Thermal buckling |
| C | 3 | j | (4) | 5.91 | 1.20 | |
| L | 7 | _b_ | (1) | 2.10 | 2.20 | |
| M | 3 | d | (4) | 5.91 | 1.12 | |
| N | 6.5 | d | (5) | 4.69 | 1.33 | |
| Q | 3 | c | (4) | 5.91 | 1.20 | |
| B | 25 | d | (2) | 0.36 | 0.12 | |
| B | 25 | _f_ | (2) | 0.36 | 0.44 | |
| B | 100 | d | (2) | 0.02 | 0.301 | |

Note: The underlined items are outside the scope of the present invention.

TABLE 9

| Steel | Plate thickness (mm) | Symbol for welding material | Treatment after heating | Traveling speed of burner (mm/sec) | Angular distortion ($\times 10^{-2}$ radian) |
|---|---|---|---|---|---|
| B | 5 | a | Air cooling | 5 | 1.51 |
| B | 5 | _b_ | Air cooling | 5 | 0.86 |
| B | 5 | c | Air cooling | 7.5 | 2.54 |
| B | 5 | d | Air cooling | 10 | 3.42 |
| B | 5 | _e_ | Air cooling | 7.5 | 1.62 |
| B | 5 | _f_ | Air cooling | 10 | 2.80 |
| B | 5 | _g_ | Air cooling | 12.5 | 4.02 |
| B | 5 | h | Air cooling | 15 | 4.30 |
| B | 5 | i | Air cooling | 12.5 | 5.16 |
| B | 5 | j | Air cooling | 15 | 4.52 |
| A | 12 | d | Air cooling | 5 | 1.81 |
| C | 12 | d | Air cooling | 7.5 | 2.24 |
| D | 12 | d | Air cooling | 10 | 2.05 |
| E | 12 | d | Air cooling | 12.5 | 1.78 |
| F | 12 | d | Air cooling | 15 | 1.19 |
| _G_ | 12 | d | Air cooling | 5 | 1.55 |
| _H_ | 12 | d | Air cooling | 7.5 | 1.86 |
| _I_ | 12 | i | Air cooling | 12.5 | 1.41 |
| J | 25 | j | Air cooling | 2.5 | 2.30 |
| J | 25 | c | Air cooling | 5 | 1.25 |
| K | 25 | d | Air cooling | 7.5 | 0.96 |
| L | 25 | d | Air cooling | 10 | 0.75 |
| M | 25 | i | Air cooling | 12.5 | 0.58 |
| N | 25 | j | Air cooling | 15 | 0.43 |
| O | 25 | d | Air cooling | 2.5 | 1.78 |
| P | 25 | d | Air cooling | 5 | 1.38 |
| Q | 25 | j | Air cooling | 7.5 | 0.98 |
| _R_ | 25 | d | Air cooling | 2.5 | 1.41 |
| _S_ | 25 | c | Air cooling | 5 | 1.00 |
| _T_ | 25 | d | Air cooling | 7.5 | 0.72 |
| _U_ | 25 | d | Air cooling | 10 | 0.45 |
| V | 12 | d | Top surface: water cooling Under surface: water cooling | 7.5 | 2.09 |
| B | 12 | d | water cooling | 7.5 | 2.53 |
| B | 100 | d | Air cooling | 1.0 | 0.71 |
| _G_ | 100 | _e_ | Air cooling | 1.0 | 0.02 |

Note: The underlined items are outside the scope of the present invention.

TABLE 10

| | |
|---|---|
| Oxygen pressure | 1.0 kg/cm$^2$ |
| Acetylene pressure | 0.1 kg/cm$^2$ (flow rate: 1770 liters/hr) |
| Bore diameter of nozzle | #50 |
| Height of nozzle | 10 mm |
| Traveling speed of burner | 2.5 to 15 cm/sec |
| After heating | Air cooling, top surface: water cooling, under surface: water cooling (water cooling with hose, flow rate: 3 liters/mm) |

Example 2

Steel plates having chemical compositions specified in Table 11 were prepared, and a T-joint fillet welding specimen shown in FIG. 3 was prepared using a welding material (a wire) and a flux specified in Table 12.

Welding conditions were as specified in Table 13.

After the completion of welding, the angular distortion δ was measured. Thereafter, the longitudinal section of the weld metal was observed for cracking of the weld metal and the shape of bead. The overall evaluation was regarded as acceptable when all requirements, i.e., a requirement that the angular distortion δ as calculated by the formula (7) using w and d values shown in FIG. 3 is less than $1.2 \times 10^{-2}$ radian, a requirement that no cracking occurs, and a requirement that the bead shape and the appearance are excellent were satisfied. On the other hand, the overall evaluation was regarded as failure when any of the above requirements could not be satisfied.

The results are given in Table 14. As is apparent from Table 14, all the joints welded under conditions according to the present invention (test No. I) had lower angular distortion, no cracking, and good bead shape and appearance, whereas all the joints which were outside the scope of the present invention with respect to all the welding conditions (test No. IV) had some problems.

When the comparative steel was used with the wire falling within the scope of the present invention (test No. II) and when the steel falling within the scope of the present invention was used with the wire being outside the scope of the present invention (test No. III), the angular distortion in welding was smaller than that for test No. IV.

TABLE 11

| Type of steel | C | Si | Mn | Al | Nb | Mo | Ti | Cu | V | B | Ca | (wt %) classification |
|---|---|---|---|---|---|---|---|---|---|---|---|---|
| A | 0.08 | 0.08 | 0.95 | 0.02 | 0.010 | 0.10 | — | — | — | — | — | Steel of inv. |
| B | 0.13 | 0.15 | 1.20 | 0.04 | 0.015 | 0.15 | — | — | — | — | — | Steel of inv. |
| C | 0.20 | 0.20 | 1.40 | 0.06 | 0.020 | 0.20 | — | — | — | — | — | Steel of inv. |
| D | 0.13 | 0.15 | 1.20 | 0.04 | 0.015 | 0.15 | 0.01 | — | — | — | — | Steel of inv. |
| E | 0.13 | 0.15 | 1.20 | 0.04 | 0.015 | 0.15 | — | 0.10 | — | — | — | Steel of inv. |
| F | 0.13 | 0.15 | 1.20 | 0.04 | 0.015 | 0.15 | — | — | 0.008 | — | — | Steel of inv. |
| G | 0.13 | 0.15 | 1.20 | 0.04 | 0.015 | 0.15 | — | — | — | 0.0010 | — | Steel of inv. |
| H | 0.13 | 0.15 | 1.20 | 0.04 | 0.015 | 0.15 | — | — | — | — | 0.0020 | Steel of inv. |
| I | 0.13 | 0.15 | 1.20 | 0.04 | 0.015 | 0.15 | 0.01 | 0.10 | 0.008 | 0.0010 | 0.0020 | Steel of inv. |
| J | 0.30 | 0.15 | 1.20 | 0.04 | 0.015 | 0.15 | — | — | — | — | — | Comp. steel |
| K | 0.13 | 0.15 | 1.20 | 0.04 | 0.015 | 0.15 | 0.15 | — | — | — | — | Comp. steel |
| L | 0.13 | 0.15 | 1.20 | 0.04 | 0.015 | 0.15 | — | 2.0 | — | — | — | Comp. steel |
| M | 0.13 | 0.15 | 1.20 | 0.04 | 0.015 | 0.15 | — | — | 0.20 | — | — | Comp. steel |
| N | 0.13 | 0.15 | 1.20 | 0.04 | 0.015 | 0.15 | — | — | — | 0.0030 | — | Comp. steel |
| O | 0.13 | 0.15 | 1.20 | 0.04 | 0.015 | 0.15 | — | — | — | — | 0.0050 | Comp. steel |

TABLE 12

| Wire No. | Weld metal | | | | | | $T_f$ value | Slag forming agent | | Iron powder | Arc stabilizer | | Classification |
|---|---|---|---|---|---|---|---|---|---|---|---|---|---|
| | C | Si | Mn | Cu | V | Ni | | TiO$_2$ | SiO$_2$ | | Na$_2$O | K$_2$O | |
| 1 | 0.12 | 0.25 | 2.00 | 0.50 | — | — | 539 | — | — | — | — | — | Wire of Inv. |
| 2 | 0.13 | 0.20 | 2.20 | — | 0.10 | — | 548 | 5.5 | 2.5 | — | 0.05 | 0.05 | Wire of Inv. |
| 3 | 0.14 | 0.20 | 2.00 | 0.30 | 0.20 | — | 555 | 0.20 | 0.20 | 8.00 | 0.20 | 0.20 | Wire of Inv. |
| 4 | 0.08 | 0.20 | 1.00 | 0.20 | — | 6.0 | 420 | — | — | — | — | — | Wire of Inv. |
| 5 | 0.08 | 0.25 | 1.00 | — | 0.20 | 6.0 | 451 | 5.50 | 2.50 | 0.20 | 0.20 | 0.20 | Wire of Inv. |
| 6 | 0.08 | 0.25 | 1.00 | 0.20 | 0.20 | 4.5 | 488 | 0.20 | 0.20 | 8.00 | 0.20 | 0.20 | Wire of inv. |
| 7 | 0.20 | 0.25 | 2.00 | 0.50 | 0.20 | 2.5 | 459 | — | — | — | — | — | Comp. wire |
| 8 | 0.04 | 0.90 | 0.40 | 0.20 | 0.60 | 0.1 | 722 | 5.50 | 2.50 | — | 0.05 | 0.05 | Comp. wire |
| 9 | 0.08 | 0.25 | 1.00 | 2.50 | 3.00 | 2.5 | 853 | 0.20 | 0.20 | 8.00 | 0.05 | 0.05 | Comp. wire |

TABLE 13

| Symbol | Shielding gas | Current (A) | Voltage (V) | Welding speed (cpm) | Heat input (Kcal/cm) |
|---|---|---|---|---|---|
| 1 | $CO_2$ | 220 | 23 | 100 | 0.71 |
| 2 | $CO_2$ | 230 | 23 | 80 | 0.95 |
| 3 | $CO_2$ | 230 | 22 | 60 | 1.21 |
| 4 | $CO_2$ | 250 | 24 | 60 | 1.43 |

TABLE 14

| Test No. | Type of steel | Wire No. | Welding condition | $Q/h^2$ Kcal/cm³ | Angular distortion $\delta \times 10^{-2}$ rad | Cracking | Appearance of bead | Overall evaluation | Reason for unsatisfactory results |
|---|---|---|---|---|---|---|---|---|---|
| I | A | 1 | 1 | 1.98 | 0.80 | None | Good | ○ | — |
|  | B | 2 | 2 | 2.64 | 0.99 | None | Good | ○ | — |
|  | C | 3 | 1 | 1.98 | 0.73 | None | Good | ○ | — |
|  | D | 4 | 2 | 2.64 | 1.04 | None | Good | ○ | — |
|  | E | 5 | 1 | 1.98 | 0.89 | None | Good | ○ | — |
|  | F | 6 | 2 | 2.64 | 0.96 | None | Good | ○ | — |
|  | G | 1 | 1 | 1.98 | 0.75 | None | Good | ○ | — |
|  | H | 2 | 2 | 2.64 | 1.12 | None | Good | ○ | — |
|  | I | 3 | 1 | 1.98 | 0.93 | None | Good | ○ | — |
| II | J | 4 | 2 | 2.64 | 1.10 | None | Good | Δ | Larger deformation than I |
|  | K | 5 | 1 | 1.98 | 0.99 | None | Good | Δ | Larger deformation than I |
|  | L | 6 | 2 | 2.64 | 1.06 | None | Good | Δ | Larger deformation than I |
|  | M | 1 | 1 | 1.98 | 0.93 | None | Good | Δ | Larger deformation than I |
|  | N | 2 | 2 | 2.64 | 1.08 | None | Good | Δ | Larger deformation than I |
|  | O | 3 | 1 | 1.98 | 0.88 | None | Good | Δ | Larger deformation than I |
| III | A | 7 | 1 | 2.64 | 1.03 | None | Good | Δ | Larger deformation than I |
|  | B | 8 | 2 | 1.98 | 0.91 | None | Good | Δ | Larger deformation than I |
|  | C | 9 | 1 | 2.64 | 1.20 | None | Good | Δ | Larger deformation than I |
| IV | J | 7 | 1 | 2.64 | 2.21 | None | Good | x | Remarkably deformed |
|  | K | 8 | 2 | 1.98 | 1.40 | None | Good | x | Remarkably deformed |
|  | L | 9 | 1 | 2.64 | 1.18 | None | Good | x | Cracked |

(Note) ○: Acceptable x: Failure

INDUSTRIAL APPLICABILITY

Welded joints are a technical element indispensable to the preparation of steel structures. In many cases, techniques for the prevention of distortion in welding and straightening the distortion are based on experience.

In recent years, a technique for reducing welding distortion has been demanded from the viewpoints of rationalization of the design and appearance of steel structures and the like. In addition, shortage of experienced welding operators and automation of welding process too have resulted in a demand for the supply of welding materials which are less likely to be distorted in welding. The present invention provides a welding method which is less likely to cause distortion in an automatic or semi-automatic welding process and, when the above technical demands are taken into consideration, is very valuable. According to the present invention, an operation for straightening the distortion may be omitted so far as no economical problem occurs. In addition, the above additional value can be advantageously realized.

We claim:

1. A steel plate less susceptible to welding distortion and highly bendable by lineal heating, said steel plate consisting essentially of, by weight,
C: 0.02 to 0.25%,
Si: 0.01 to 2.0%,
Mn: 0.30 to 1.5%,
Al: 0.003 to 0.10%,
Nb: 0.005 to 0.10%, and
Mo: 0.05 to 1.00%, with the balance consisting of Fe and unavoidable impurities;

said steel plate has a thickness of 3 to 100 mm;

said steel plate has a yield stress $\sigma_{yT}$ in MPa at a selected temperature T, wherein T is a temperature in °C. in a temperature range between room temperature and 600° C.;

said steel plate has a yield stress $\sigma_y$ in MPa at room temperature; and ratio of $\sigma_{yT}$ to $\sigma_y$ of said steel plate satisfies formula (1):

$$1.00 - 1.083 \times 10^{-3} T < (\sigma_{yT}/\sigma_y) < 1.16 - 5.101 \times 10^{-4} T \quad (1).$$

2. A steel plate less susceptible to welding distortion and highly bendable by lineal heating, said steel plate consisting essentially of, by weight,
C: 0.02 to 0.25%,
Si: 0.01 to 2.0%,
Mn: 0.30 to 1.5%,
Al: 0.003 to 0.10%,
Nb: 0.005 to 0.025%, and
Mo: 0.05 to 0.25%, with the balance consisting of Fe and unavoidable impurities;

said steel plate has a thickness of 3 to 25 mm;

said steel plate has a yield stress $\sigma_{yT}$ in MPa at a selected temperature T, wherein T is a temperature in °C. in a temperature range between room temperature and 600° C.;

said steel plate has a yield stress $\sigma_y$ in MPa at room temperature; and ratio of $\sigma_{yT}$ to $\sigma_y$ of said steel plate satisfies formula (2):

$$1.00 - 1.083 \times 10^{-3} T < (\sigma_{yT}/\sigma_y) < 1.16 - 7.333 \times 10^{-4} T \quad (2).$$

3. The steel plate according to claim 1, which further comprises by weight at least one member selected from
Ti: 0.001 to 0.10%,
Cu: 0.05 to 2.0%, Ni: 0.05 to 3.5%,
Cr: 0.05 to 1.5%,
Co: 0.05 to 0.5%,
W: 0.05 to 0.5%,
V: 0.002 to 0.10%,
B: 0.0002 to 0.0025%,
REM: 0.002 to 0.10%, and
Ca: 0.0003 to 0.0040%.

4. The steel plate according to claim 3, which further comprises by weight at least one member selected from
Cu: 0.05 to 1.5% and
Ni: 0.05 to 1.5%.

5. A process for producing a steel plate less susceptible to welding distortion and highly bendable by lineal heating, characterized by comprising the steps of: casting a steel, comprising by weight
C: 0.02 to 0.25%,
Si: 0.01 to 2.0%,
Mn: 0.30 to 1.5%,
Al: 0.003 to 0.10%,
Nb: 0.005 to 0.10%, and
Mo: 0.05 to 1.00%,
with the balance consisting of Fe and unavoidable impurities, into a steel ingot or a steel slab; initiating rolling either directly before the temperature is lowered to below 1100° C. or after reheating to 1100° C. or above, to a total reduction ratio of less than 50% at 900° C. or below and terminating the rolling at 850° C. or above to prepare a steel plate having a thickness of 3 to 100 mm.

6. A process for producing a steel plate less susceptible to welding distortion and highly bendable by lineal heating, characterized by comprising the steps of: casting a steel, consisting essentially of by weight
C: 0.02 to 0.25%,
Si: 0.01 to 2.0%,
Mn: 0.30 to 1.5%,
Al: 0.003 to 0.10%,
Nb: 0.005 to 0.025%, and
Mo: 0.05 to 0.25%,
with the balance consisting of Fe and unavoidable impurities, into a steel ingot or a steel slab; initiating rolling either directly before the temperature is lowered to below 1100° C. or after reheating to 1100° C. or above, to a total reduction ratio of less than 50% at 900° C. or below and terminating the rolling at 850° C. or above to prepare a steel plate having a thickness of 3 to 25 mm.

7. The process according to claim 5, wherein, upon the termination of rolling, the steel plate is cooled to 200° to 500° C. at a rate of 1° to 40° C./sec.

8. The process according to claim 7, wherein the steel further comprises by weight at least one member selected from
Ti: 0.001 to 0.10%,
Cu: 0.05 to 2.0%,
Ni: 0.05 to 3.5%,
Cr: 0.05 to 1.5%,
Co: 0.05 to 0.5%,
W: 0.05 to 0.5%,
V: 0.002 to 0.10%,
B: 0.0002 to 0.0025%, REM: 0.002 to 0.10%, and
Ca: 0.0003 to 0.0040%.

9. The process according to claim 8, wherein the steel further comprises by weight at least one member selected from
Cu: 0.05 to 1.5% and
Ni: 0.05 to 1.5%.

10. A weld metal formed by a deposited welding material, said weld metal consisting essentially of by weight, based on total weight of said weld metal,
C: 0.03 to 0.15%,
Si: 0.2 to 1.0%, and
Mn: 0.3 to 3.0%,
and at least one member selected from a group consisting of:
Cu: 0.1 to 1.5%,
Cr: 0.1 to 3.0%,
Mo: 0.1 to 2.0%,
V: 0.1 to 0.7%, and
Nb: 0.01 to 0.50%
with the balance consisting of Fe and unavoidable impurities;

said weld metal has a α-γ transformation temperature $T_F$ below 620° C., $T_F$ determined by formula (3) with respect to % by weight of each element in the weld metal:

$T_F$ (°C.) = 630 − 476.5 C + 56 Si − 19.7 Mn − 16.3 Cu − 26.6 Ni − 4.9 Cr + 38.1 Mo + 124.8 V + 136.3 Ti − 19.1 Nb + 198.4 Al + 3315B . . . (3);

said weld metal has a yield stress $\sigma_{yoT0}$ in MPa at a selected temperature $T_0$, wherein $T_0$ is a temperature in °C. between room temperature and 600° C.;

said weld metal has a yield stress $\sigma_{yo}$ in MPa at room temperature; and ratio of $\sigma_{yoT0}$ to $\sigma_{yo}$ of said weld metal satisfies formula (4):

$$1.00-1.083\times10^{-3}T_0<(\sigma_{yoT0}/\sigma_{yo})<1.16-5.101\times10^{-4}T_0 \quad (4).$$

11. The welding material according to claim 10, which further comprises by weight Ni: 0.2 to 9%.

12. The welding material according to claim 10, which further comprises a titania-based flux filled into the core thereof, the titania-based flux containing, by weight based on the total weight of the welding material,
$TiO_2$: 2.5 to 6.5% and
oxides other than $TiO_2$: 0.3 to 2.5%.

13. The welding material according to claim 10, which further comprises a metallic powder-based flux filled into the core thereof, the metallic powder-based flux containing, by weight based on the total weight of the welding material,
iron powder: 4.0 to 12.0%,
arc stabilizer: 0.05 to 1.1%, and
slag-forming agent other than the arc stabilizer: 0.3 to 3.5%.

14. A gas shielded arc welding method, which is less likely to cause welding distortion, comprising a steel plate consisting essentially of by weight
C: 0.02 to 0.25%,
Si: 0.01 to 2.0%, and
Mn: 0.30 to 1.5%,
Al: 0.003 to 0.10%
Nb: 0.005 to 0.10%, and Mo: 0.05 to 1.00%,
with the balance consisting of Fe and unavoidable impurities, the steel plate having a thickness of 3 to 100 mm, is welded by gas shielded arc welding using a welding material consisting essentially of, by weight based on the total weight of a weld metal, C: 0.03 to 0.15%,
Si: 0.2 to 1.0%, and
Mn: 0.3 to 3.0% and at least one member selected from

Cu: 0.1 to 1.5%,
Cr: 0.1 to 3.0%,
Mo: 0.1 to 2.0%,
V: 0.1 to 0.7%, and
Nb: 0.01 to 0.50% with the balance consisting of Fe and unavoidable impurities, said weld metal has a α-γ transformation temperature T below 620° C., determined by formula (3) with respect to % by weight of each element in the weld metal:

$$T (°C.) = 630 - 476.5 C + 56 Si - 19.7 Mn - 16.3 Cu - 26.6 Ni - 4.9 Cr + 38.1 Mo + 124.8 V + 136.3 Ti - 19.1 Nb + 198.4 Al + 3315B \ldots (3);$$

said weld metal has a yield stress $\sigma_{yoT0}$ in MPa at a selected temperature $T_0$, wherein $T_0$ is a temperature in °C. between room temperature and 600° C.;
said weld metal has a yield stress $\sigma_{yo}$ in MPa at room temperature; and
ratio of $\sigma_{yoT0}$ to $\sigma_{yo}$ of said weld metal satisfies formula (4):

$$1.00-1.083\times10^{-3}T_0 < (\sigma_{yoT0}/\sigma_{yo}) < 1.16-5.101\times10^{-4}T_0 \quad (4).$$

15. The gas shielded arc welding method according to claim 14, wherein the steel plate further comprises by weight
Nb: 0.005 to 0.025% and
Mo: 0.05 to 0.25%
and has a thickness of 3 to 25 mm.

16. The gas shielded arc welding method according to claim 14, wherein the steel plate further comprises by weight at least one member selected from
Ti: 0.001 to 0.10%,
Cu: 0.05 to 2.0%,
Ni: 0.05 to 3.5%,
Cr: 0.05 to 1.5%,
Co: 0.05 to 0.5%,
W: 0.05 to 0.5%,
V: 0.002 to 0.10%,
B: 0.0002 to 0.0025%,
REM: 0.002 to 0.10%, and
Ca: 0.0003 to 0.0040%.

17. The gas shielded arc welding method according to claim 14, wherein the welding material further comprises by weight Ni: 0.2 to 9%.

18. The gas shielded arc welding method according to claim 14, wherein the welding material further comprises a titania-based flux filled into the core thereof, the titania-based flux containing, by weight based on the total weight of the welding material,
TiO$_2$: 2.5 to 6.5% and
oxides other than TiO$_2$: 0.3 to 2.5%.

19. The gas shielded arc welding method according to claim 14, wherein the welding material further comprises a metallic powder-based flux provided on the circumference thereof, the metallic powder-based flux containing, by weight based on the total weight of the welding material,
iron powder: 4.0 to 12.0%,
arc stabilizer: 0.05 to 1.1%, and
slag-forming agent other than the arc stabilizer: 0.3 to 3.5%.

20. The process according to claim 6, wherein, upon the termination of rolling, the steel plate is cooled to 200° to 500° C. at a rate of 1° to 40° C./sec.

21. The process according to claim 6, wherein the steel further comprises by weight at least one member selected from
Ti: 0.001 to 0.10%
Cu: 0.05 to 2.0%
Ni: 0.05 to 3.5%
Cr: 0.05 to 1.5%
Co: 0.05 to 0.5%
W: 0.05 to 0.5%
V: 0.002 to 0.10%
B: 0.0002 to 0.0025%
REM: 0.002 to 0.10%, and
Ca: 0.0003 to 0.0040%.

22. The process according to claim 21, wherein the steel further comprises by weight at least one member selected from
Cu: 0.05 to 1.5% and
Ni: 0.05 to 1.5%.

23. A weld metal according to claim 10 wherein said ratio $\sigma_{yoT0}$ to $\sigma_{yo}$ of said weld metal satisfies formula (5):

$$1.00-1.083\times10^{-3}T_0 < (\sigma_{yoT0}/\sigma_{yo}) < 1.16-7.333\times10^{-4}T_0 \quad (5).$$

* * * * *

UNITED STATES PATENT AND TRADEMARK OFFICE
CERTIFICATE OF CORRECTION

PATENT NO. : 5,718,776
DATED : February 17, 1998
INVENTOR(S) : Atsuhiko YOSHIE, et al.

It is certified that error appears in the above-indentified patent and that said Letters Patent is hereby corrected as shown below:

Column 4, line 20, change "...3T:19..." to --...3T-19...--

Column 9, line 22, change "A" to --$\underline{A}$--.

Column 11, line 26, before "it" insert --when--.

Column 13, line 20, change "($Ar_3$tm..." to --($Ar_3$ tm...--.

Column 13, line 67, after "used" insert --for--.

Column 15, line 51, change "become" to --becomes--.

Column 15, line 66, change "become" to --becomes--.

Column 19, line 20, delete the comma after "SM-1".

Column 19, line 23, delete the comma after "SM-1".

Column 22, Table 12, close space on headings of columns "$T_r$ value", "Iron powder", and Classification".

Column 25, line 17, delete "comprising" and insert --consisting essentially of,--.

Column 25, line 55, change "7" to --5--.

UNITED STATES PATENT AND TRADEMARK OFFICE
CERTIFICATE OF CORRECTION

PATENT NO. : 5,718,776
DATED : February 17, 1998
INVENTOR(S) : Atsuhiko YOSHIE, et al.

It is certified that error appears in the above-indentified patent and that said Letters Patent is hereby corrected as shown below:

Column 26, line 9, after "of" insert a comma.

Column 26, line 30, change "...3315B" to --...3315 B--.

Column 27, line 25, change "...3315B" to --...3315 B--.

Column 28, line 13, change TiO$_2$:2.5" to --TiO$_2$: 2.5--.

Column 28, line 14, change TiO$_2$:0.3" to --TiO$_2$: 0.3--.

Column 28, line 46, after "1.5%" insert a comma.

Signed and Sealed this

Thirteenth Day of October 1998

Attest:

BRUCE LEHMAN

Attesting Officer

Commissioner of Patents and Trademarks